United States Patent
Pezeshki et al.

(10) Patent No.: US 12,021,598 B2
(45) Date of Patent: Jun. 25, 2024

(54) MODIFICATION OF SSB BURST PATTERN

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/238,122

(22) Filed: Apr. 22, 2021

(65) Prior Publication Data

US 2021/0336687 A1 Oct. 28, 2021

Related U.S. Application Data

(60) Provisional application No. 63/015,291, filed on Apr. 24, 2020, provisional application No. 63/015,284, (Continued)

(51) Int. Cl.
| | |
|---|---|
| *H04W 4/00* | (2018.01) |
| *G06N 20/00* | (2019.01) |
| *H04B 7/08* | (2006.01) |
| *H04W 16/28* | (2009.01) |
| *H04W 56/00* | (2009.01) |

(52) U.S. Cl.
CPC ............ *H04B 7/088* (2013.01); *G06N 20/00* (2019.01); *H04W 16/28* (2013.01); *H04W 56/001* (2013.01)

(58) Field of Classification Search
CPC ........ H04B 7/088; H04W 16/28; G06N 20/00
See application file for complete search history.

(56) References Cited

U.S. PATENT DOCUMENTS

| | | | |
|---|---|---|---|
| 10,993,236 B2 * | 4/2021 | Zhu ...................... | H04B 7/0695 |
| 2019/0021062 A1 * | 1/2019 | Abedini ................ | H04L 5/0053 |

(Continued)

FOREIGN PATENT DOCUMENTS

| | | | | |
|---|---|---|---|---|
| WO | WO-2020013645 A1 * | 1/2020 | ............ | H04W 16/28 |
| WO | WO-2020119893 A1 * | 6/2020 | ........... | H04B 7/0617 |
| WO | WO-2021032267 A1 * | 2/2021 | ........... | H04B 7/0626 |

*Primary Examiner* — Elisabeth Benoit Magloire
(74) *Attorney, Agent, or Firm* — Patterson & Sheridan, LLP

(57) ABSTRACT

Certain aspects of the present disclosure provide techniques for efficiently selecting beams for synchronization signal block (SSB) burst transmissions based on a condition. Techniques include selecting certain directions to transmit higher power beams and selecting certain directions to transmit lower power SSB burst transmissions. In some cases, an SSB burst parameter may be modified to use a reduced number of optimal SSB beams. The modified SSB burst parameter may have a reduced SSB burst duration, which may allow for reduced monitoring time by a UE and/or free up resources (that would otherwise be used for SSB transmissions) for data transmissions. Additional aspects relate generally to the beam management procedures in wireless communications systems. Some aspects more specifically relate to the selection of beams for communications to and from a UE and a network entity based on predicted mobility state information for a user equipment (UE).

30 Claims, 18 Drawing Sheets

Related U.S. Application Data filed on Apr. 24, 2020, provisional application No. 63/015,377, filed on Apr. 24, 2020.

(56) References Cited

U.S. PATENT DOCUMENTS

| | | | |
|---|---|---|---|
| 2019/0037481 A1* | 1/2019 | Zhang | H04L 5/0032 |
| 2019/0363809 A1* | 11/2019 | Yoon | H04W 24/08 |
| 2019/0364599 A1* | 11/2019 | Islam | H04L 5/0048 |
| 2020/0015214 A1* | 1/2020 | Si | H04W 76/14 |
| 2020/0037230 A1* | 1/2020 | Chen | H04J 11/0073 |
| 2020/0053670 A1* | 2/2020 | Jung | H04W 56/00 |
| 2020/0076568 A1* | 3/2020 | Nguyen | H04W 56/0005 |
| 2020/0100290 A1* | 3/2020 | Mundarath | H04W 74/0833 |
| 2020/0100295 A1* | 3/2020 | Pao | H04L 5/0082 |
| 2020/0137602 A1* | 4/2020 | Zhang | H04W 72/23 |
| 2020/0187185 A1* | 6/2020 | Zhu | H04W 56/0015 |
| 2020/0205102 A1* | 6/2020 | Islam | H04W 24/10 |
| 2021/0234591 A1* | 7/2021 | Eleftheriadis | H04B 7/0626 |
| 2021/0235513 A1* | 7/2021 | Kim | H04W 74/0816 |
| 2021/0351885 A1* | 11/2021 | Chavva | G06N 3/04 |
| 2022/0158710 A1* | 5/2022 | Takano | H04B 7/0695 |
| 2022/0174620 A1* | 6/2022 | Cha | H04L 5/0023 |
| 2022/0217660 A1* | 7/2022 | Liu | H04W 56/001 |
| 2022/0271818 A1* | 8/2022 | Svendsen | H04B 7/0897 |
| 2022/0346151 A1* | 10/2022 | Takeda | H04W 74/0833 |
| 2022/0352962 A1* | 11/2022 | Huang | H04B 7/088 |

* cited by examiner

MODIFICATION OF SSB BURST PATTERN

CROSS-REFERENCE TO RELATED APPLICATIONS

This application claims the benefit of U.S. Provisional Patent Application 63/015,284, filed on Apr. 24, 2020, U.S. P 63/015,291, filed on Apr. 24, 2020, U.S. P 63/015,377, filed on Apr. 24, 2020, each of which are incorporated herein by reference.

FIELD OF THE DISCLOSURE

Aspects of the present disclosure relate to wireless communications, and more particularly, to techniques for efficient beam selection for synchronization signal block (SSB) transmissions.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient modification of synchronization signal block (SSB) patterns, for example, to select a reduced number of optimal beams that may allow for reduced monitoring time by a UE and/or free up resources for data transmissions. Additional advantages include efficient modification of transmit power of beams in synchronization signal block (SSB) bursts. Additional advantages further include efficient selection of beams for communications to and from a UE and a network entity, for example, to select a reduced number of optimal beams that may allow for reduced monitoring time by a UE and/or free up resources for data transmissions.

Certain aspects of the subject matter described in this disclosure can be implemented in a method for wireless communication by a network entity. The method generally includes detecting at least one condition, modifying a synchronization signal block (SSB) burst pattern that identifies SSB positions for sweeping a set of SSB beams based on the detected condition, and transmitting SSBs according to the modified SSB burst pattern.

Certain aspects of the subject matter described in this disclosure can be implemented in a method for wireless communication by a network entity. The method generally includes detecting at least one condition, modifying a synchronization signal block (SSB) burst pattern that identifies SSB positions for sweeping a set of SSB beams based on the detected condition, and transmitting SSBs according to the modified SSB burst pattern.

Certain aspects of the subject matter described in this disclosure can be implemented in a method for wireless communication by a network entity. The method generally includes determining a synchronization signal block (SSB) burst pattern that identifies SSB positions for sweeping a set of SSB beams, and transmitting SSBs according to the SSB burst pattern, the SSBs are transmitted with a first subset of SSB beams are transmitted with a higher transmit power than SSBs transmitted with a second subset of SSB beams.

Certain aspects of the subject matter described in this disclosure can be implemented in a method for wireless communication for a user equipment (UE). The method generally includes determining a synchronization signal block (SSB) burst pattern that identifies SSB positions that a network entity uses for sweeping a set of SSB beams, obtaining information regarding a first subset of the SSB beams transmitted with higher transmit power than SSB beams transmitted with a second subset of the SSB beams, monitoring SSBs according to the SSB burst pattern, and adjusting at least one of SSB measurements or SSB measurement reporting based on the information.

One innovative aspect of the subject matter described in this disclosure can be implemented in a method for wireless communication. The method can be performed, for example, by a user equipment (UE). The method generally includes predicting a mobility state of the UE at a future time; transmitting, to a network entity, a report including information associated with the predicted mobility state of the UE and a location of the UE; and receiving, from the network entity, one or more synchronization signal blocks (SSBs) based on transmitting the report to the network entity, wherein the one or more SSBs comprise SSBs transmitted on beams based on the location of the UE.

In some implementations, predicting the mobility state of the UE may comprise predicting the mobility state based on a machine learning model. The machine learning model may be trained to predict whether the UE will be moving or stationary based on time and location information.

In some implementations, predicting the mobility state of the UE may comprise predicting the mobility state based on UE contextual information. The UE contextual information may comprise a signal strength metric for signals received from each of a plurality of network entities.

In some implementations, predicting the mobility state of the UE may comprise periodically receiving a triggering message to predict the mobility state of the UE and determining the mobility state of the UE in response to receiving the triggering message.

In some implementations, predicting the mobility state of the UE may comprise identifying an occurrence of one or more predefined triggering events and determining the mobility state of the UE in response to identifying the occurrence of the one or more predefined triggering events.

In some implementations, the report may be transmitted via one of radio resource control (RRC) signaling, a medium access control (MAC) control element (CE) (MAC-CE), or uplink control information (UCI).

In some implementations, the method may further comprise determining a location of the UE. Receiving the one or more SSBs may be based on the determined location of the UE.

In some implementations, the received one or more SSBs may comprise SSBs selected by the network entity based on the information associated with the mobility state of the UE.

Another innovative aspect of the subject matter described in this disclosure can be implemented in a method for wireless communication. The method can be performed, for example, by a network entity, such as a gNodeB. The method generally includes receiving, from a user equipment (UE), a report including a predicted mobility state of the UE; determining, based on the predicted mobility state of the UE, a periodicity for transmitting a plurality of synchronization signal blocks (SSBs) to the UE; and transmitting the plurality of SSBs to the UE based on the determined periodicity.

In some implementations, the report may include a location of the UE. The method may further include determining, based on the location of the UE, an SSB pattern including the plurality of SSBs to transmit and a transmit power for each of the plurality of SSBs in the plurality of SSBs.

In some implementations, the method may further include transmitting, to the UE, configuration information identifying a number of network entities for the UE to monitor to determine the predicted UE mobility state.

In some implementations, the report may be received via one of radio resource control (RRC) signaling, a medium access control (MAC) control element (CE), or uplink control information (UCI).

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
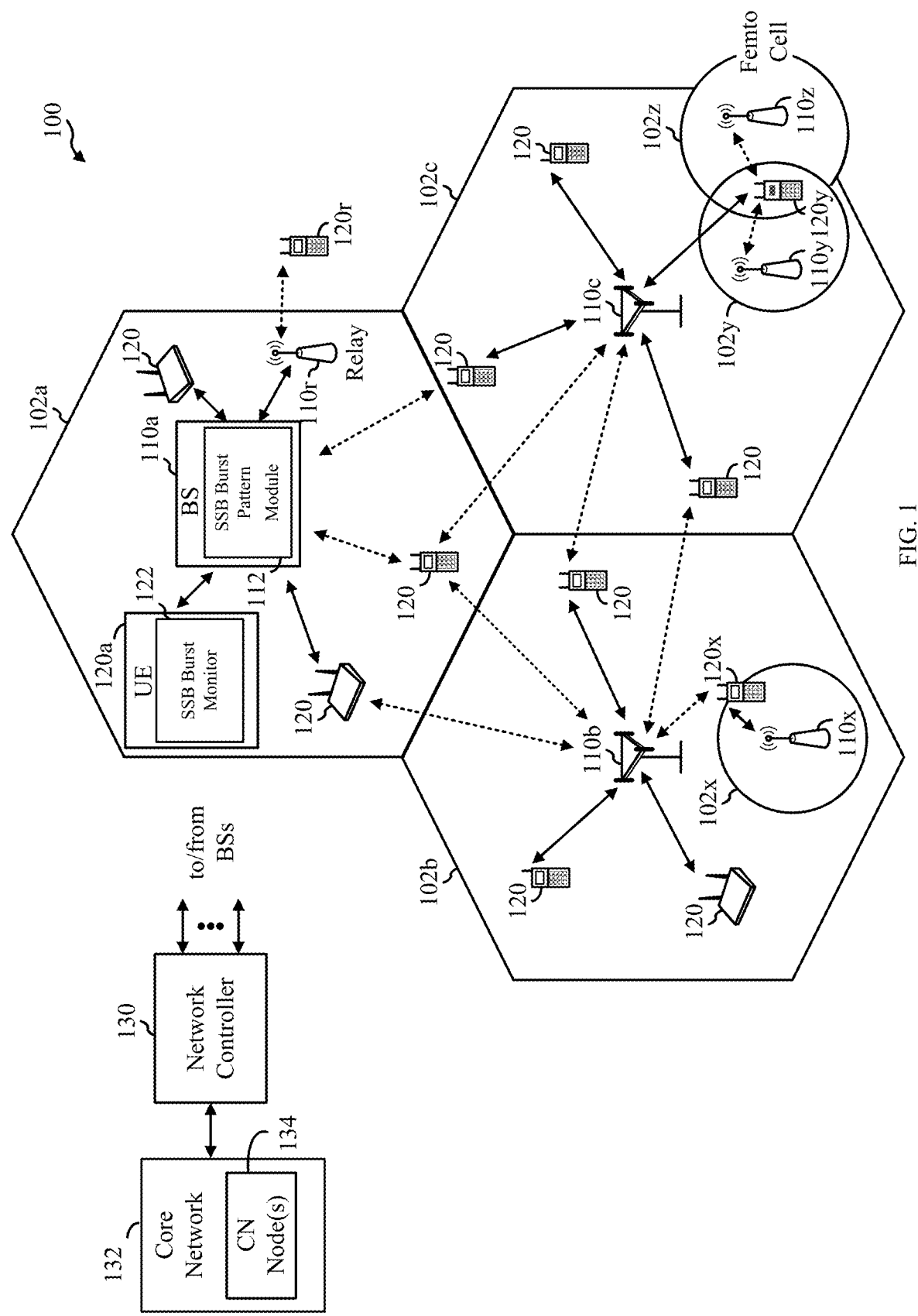
FIG. 1 is a block diagram conceptually illustrating an example wireless communication network, in accordance with certain aspects of the present disclosure.

Aspects of the present disclosure provide apparatus, methods, processing systems, and computer readable mediums for efficiently selecting beams for synchronization signal block (SSB) burst transmissions. In some cases, using a reduced number of optimal SSB beams may reduce an SSB burst duration, which may allow for reduced monitoring time by a UE. Using a reduced number of optimal SSB beams may also free up resources, that would otherwise be used for SSB transmissions, for data transmissions.

The following description provides examples of SSB burst pattern modification and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

FIG. 1 illustrates an example wireless communication network 100 in which aspects of the present disclosure may be performed. For example, a base station (BS) 110a of the wireless communication network 100 may be configured with an SSB Burst Pattern module 112 configured to perform (or assist BS 110 in performing) operations 600 of FIG. 6 to modify an SSB burst pattern and/or operations 1300 of FIG. 13, in accordance with aspects of the present disclosure. Similarly, a UE 120a of the wireless communication network 100 may be configured with an SSB Burst Monitor 122 configured to perform (or assist UE 120 in performing) operations 700 of FIG. 7 to monitor for SSB bursts (e.g., from BS 110a) and/or operations 1200 of FIG. 12, in accordance with aspects of the present disclosure.

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
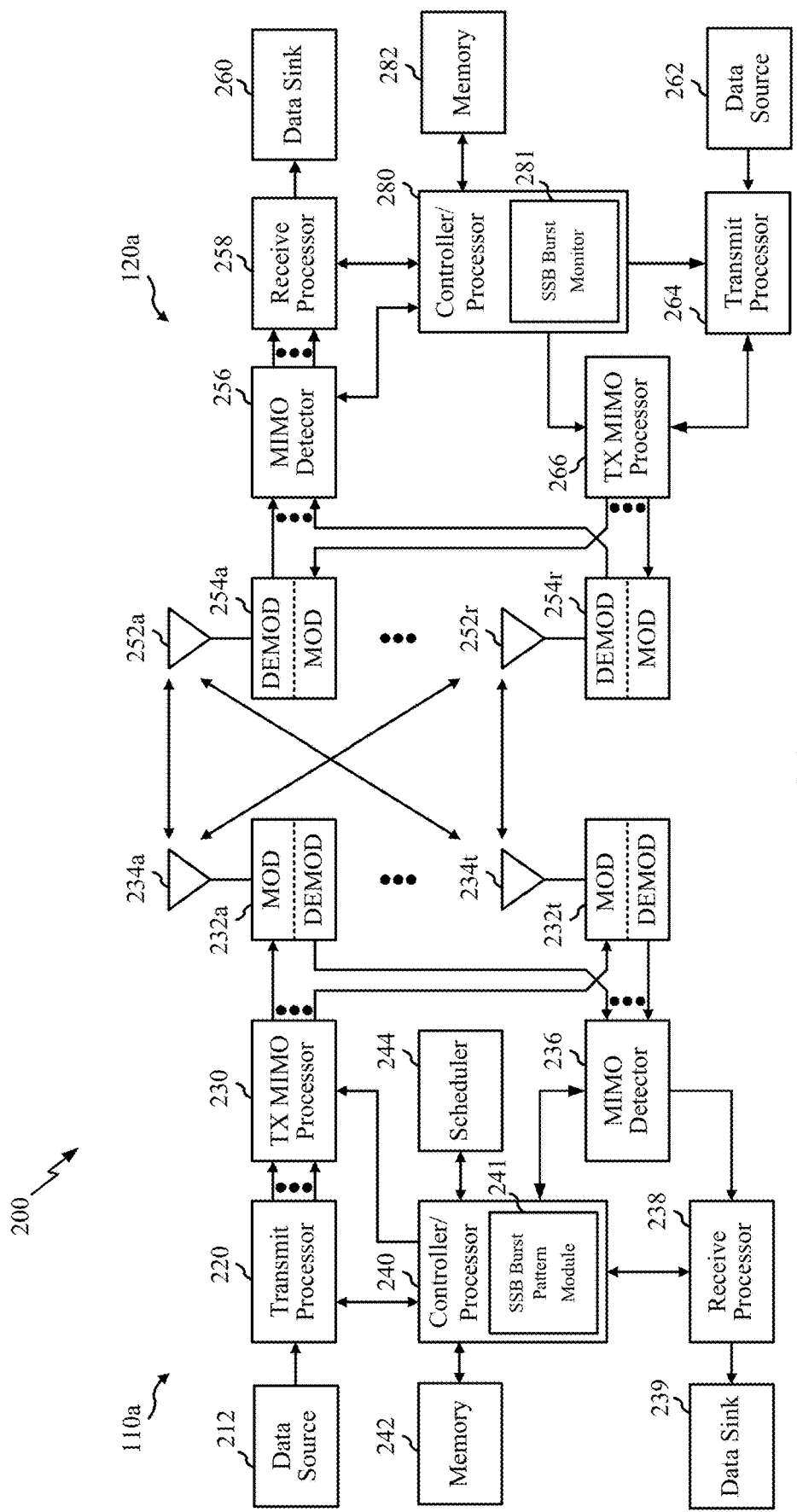
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an SSB Burst Pattern Module 241 and the controller/processor 280 of the UE 120a has an SSB Burst Monitor Module 281. The SSB Burst Pattern Module 241 may be configured to perform operations 600 of FIG. 6 and/or operations 1300 of FIG. 13. The SSB Burst Monitor Module 281 may be configured to perform operations 700 of FIG. 7 and/or operations 1200 of FIG. 12. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). The symbol and slot lengths scale with the subcarrier spacing. The CP length also depends on the subcarrier spacing.

Figure 3:
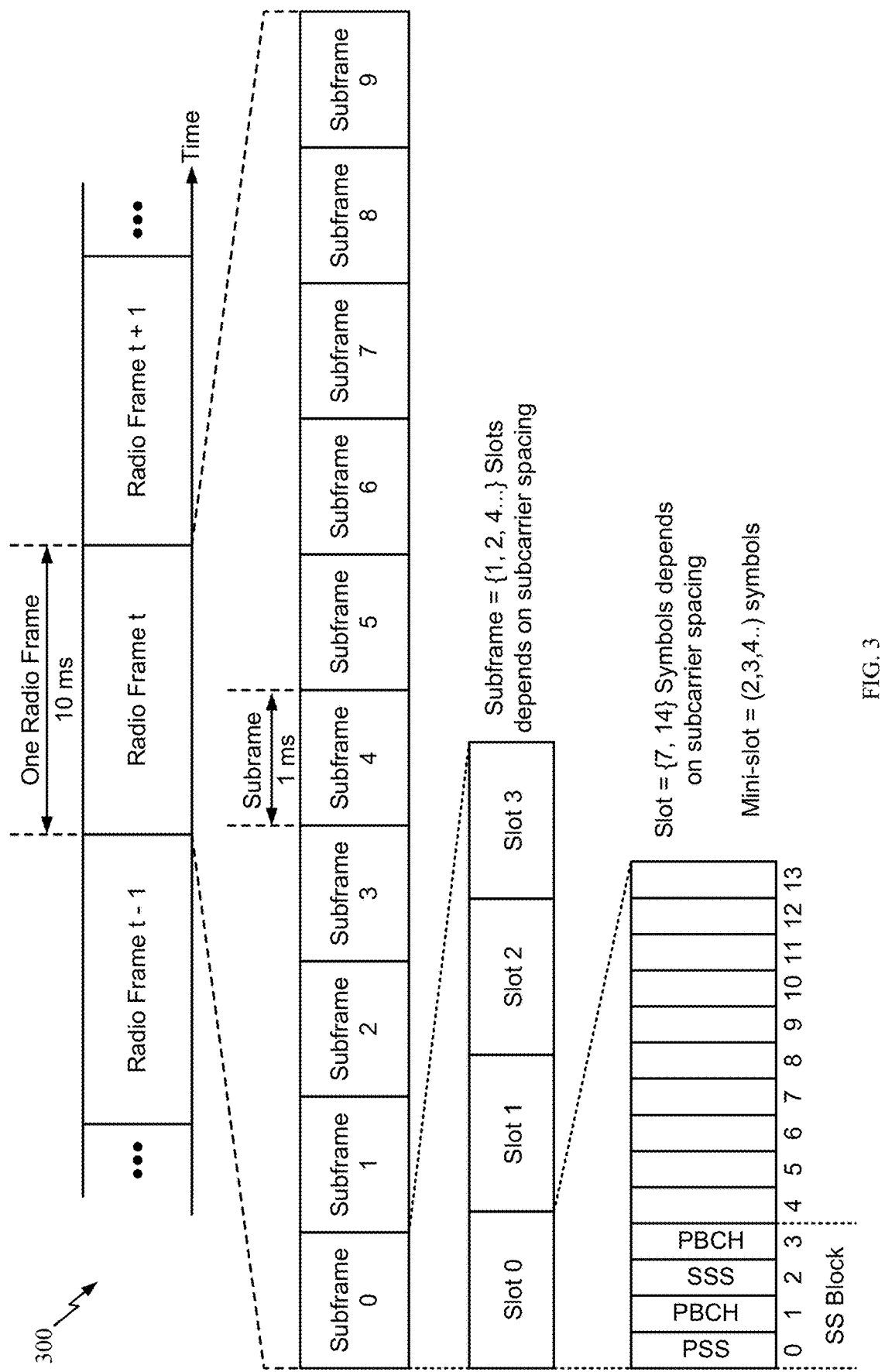
FIG. 3 is an example frame format for communication in a wireless communication network, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 6:
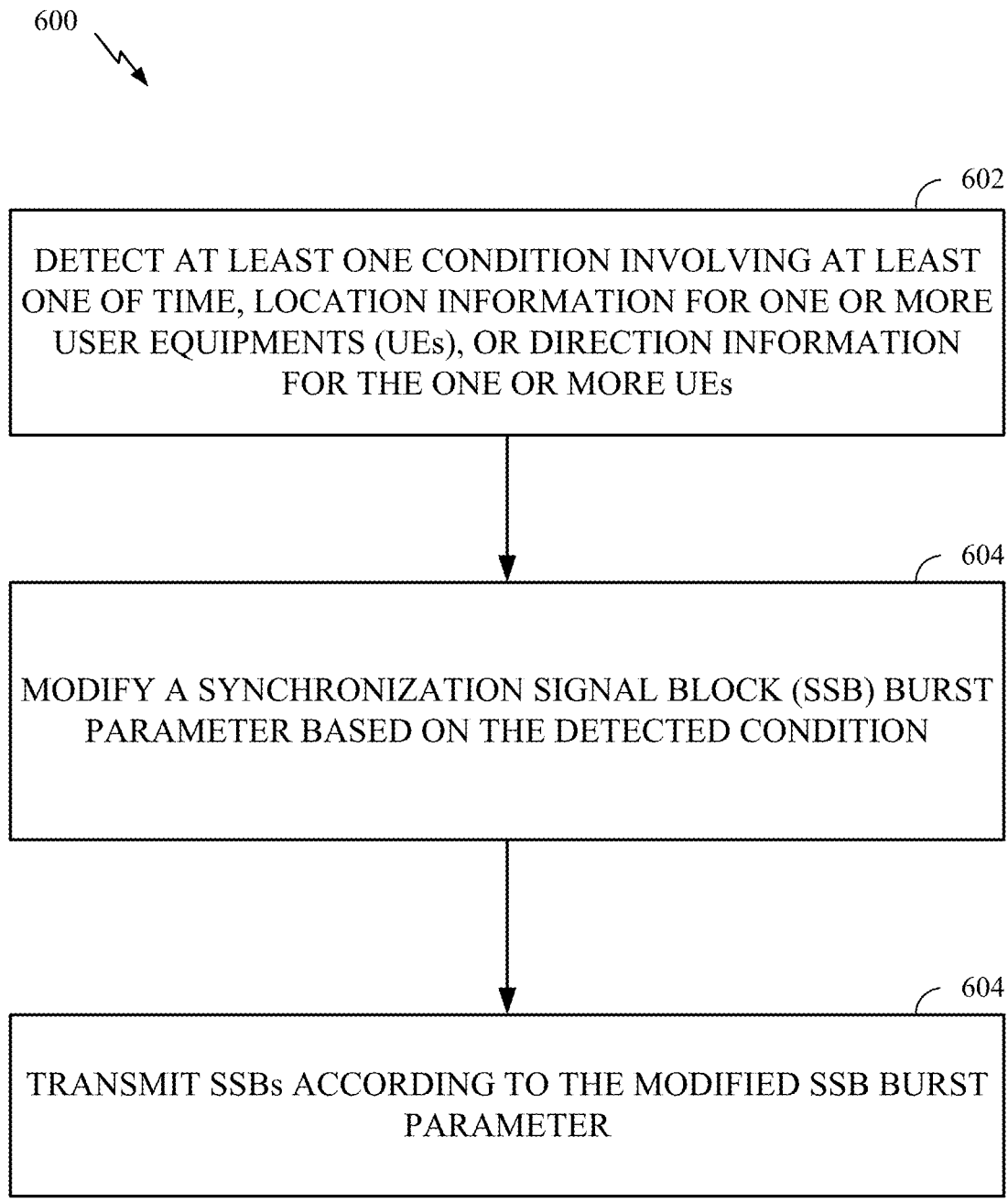
FIG. 6 illustrates example operations for wireless communication by a network entity, in accordance with certain aspects of the present disclosure.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIGs), other system information (OSI) can be transmitted on a physical downlink shared channel (PDSCH) in certain subframes.

Figure 4:
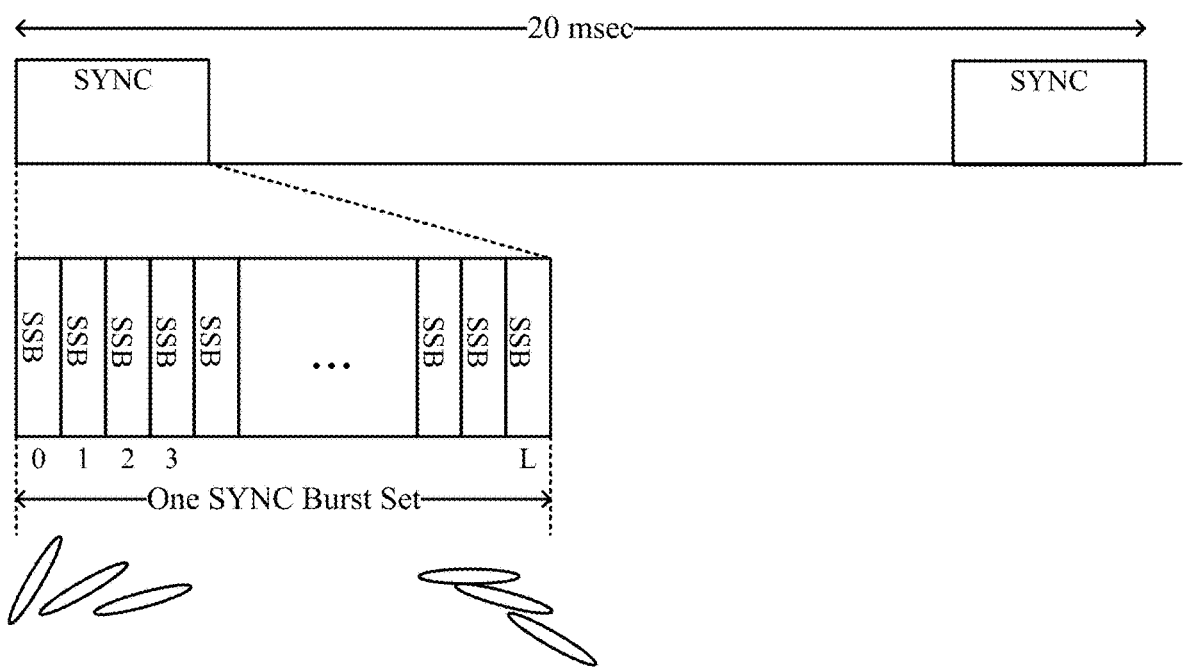
FIG. 4 illustrates how different synchronization signal blocks (SSBs) may be sent using different beams, in accordance with certain aspects of the present disclosure

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Example ML-Based Beam Prediction

SSB bursts, as shown in FIG. 4, may be used for beam management. Typical beam management procedures may entail a beam sweep across each of the beam directions that a network entity can perform transmissions on. The beam directions may, for example, cover 360 degrees around the network entity over a plurality of directions (e.g., 64 different beam directions). However, for any given UE, only a subset of these beams may be detected. For example, transmissions using a beam direction opposite of a direction from the network entity to the UE may not be received by the UE. Because only a subset of the beams may be detected, the network entity may waste network resources in performing a beam sweep across each of the plurality of directions, which may reduce the amount of resources available for other transmissions (e.g., data transmissions).

According to certain aspects of the present disclosure, beam management procedures may be enhanced (e.g., in FR2) using side-information and machine learning models. The side information may include, for example, UE position information, which may be latitude/longitude information from a satellite positioning system, time difference of arrival (TDOA), UE orientation information, and the like.

Figure 5:
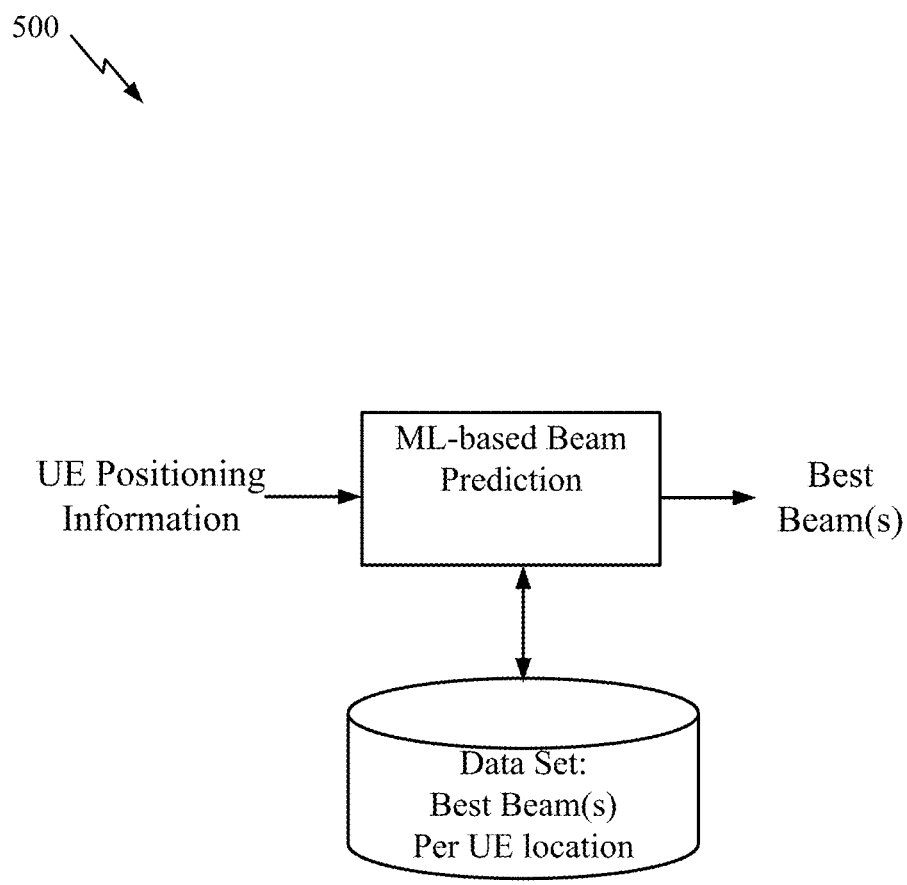
FIG. 5 illustrates an example machine learning (ML) based beam prediction module, in accordance with certain aspects of the present disclosure.

As illustrated in FIG. 5, a machine learning (ML) based (beam prediction) model may be trained to learn relationships between the location of a UE (or other positioning information, such as direction and/or device orientation) and one or more (best/optimal) beam directions that may be used to communicate with the UE. Location computations may be performed at the UE, at a gNB, or location server referred to as a location management function (LMF). As the size of the dataset (associating UE location to one or more best beams) may be very large, it is not feasible to share the entire dataset with the UE. In some cases, rather than share the data set, a more practical approach may be to train the model, such as a neural network (NN), using the dataset, and then share the neural network model and the parameters (e.g., weights and the like) for the trained model with the UE. The UE can then use the trained NN to infer the best gNB beam(s) based on its own position.

Such a machine learning model may be trained using various techniques to learn optimal beam directions for a given reported location, and given an input of a reported UE location, the trained machine learning model can predict a set of beams to use in performing a beam sweep. This set of beams may be a subset of the beam directions that are supported by the network entity such that the network entity need not sweep across each possible beam direction in order to identify beams to use in communicating with the UE.

In some embodiments, the machine learning model may be trained using supervised learning techniques in which an input data set of a plurality of {location, beam direction(s)} two-tuples is used to train the machine learning model to recognize relationships between different locations and the optimal beam directions for communicating with a UE at different locations. The input data set may be, for example, information received in relation to communications using sub-6 GHz bands, and the machine learning model may be trained to output information that may be relevant to communications using other bands (e.g., mmWave bands), such as a predicted best beam or set of best beams to use to communicate with the UE. In some embodiments, the machine learning model may include a softmax layer that generates a probability score for each beam direction that a network entity can use to communicate with a UE. The beam(s) that may be identified as the best beams to communicate with the UE may, thus, be the n beams with the highest probability scores generated by the machine learning model, given the location of the UE as input.

The machine learning model may be trained offline and deployed to a network entity (e.g., a gNodeB) for use in identifying a best beam or a probable best beam for use in communicating with a UE based on a reported UE location. During deployment, the UE may independently measure UE location and identify a best beam (e.g., based on a beam sweep). If the identified best beam matches the best beam predicted by the machine learning model, it may be determined that the machine learning model is accurate. If, however, the identified best beam is a mismatch with the best beam predicted by the machine learning model, one or more errors in the machine learning model or in identifying the best beam may exist. As an example, potential mismatch may be due to error in location estimate in the deployment phase or the dataset being inaccurate.

As another example, the best/optimal beam directions in the deployment phase may be inaccurate, for example, due to poor reference signal received power (RSRP) or signal-to-interference-plus-noise (SINR) may be inaccurate. Another potential source of mismatch is that even though the location estimates and best beam estimates may be accurate, the actual environment is different in the deployment phase, compared to the training phase. In other words, there may be some dynamic aspects of the deployment environment that were not captured during the offline training phase (e.g., such as a car passing by, or the like). It may be difficult to alleviate mismatch caused by such issues due to the different environment. However, if it is consistently observed that for a given UE position, other sets of best beams are reported by UE (different than the ML-predicted beams) then it may be possible to infer that this mismatch is not due to dynamics of the environment, and that the dataset needs to be updated.

The machine learning described herein may use any appropriate machine learning algorithm. In some non-limiting examples, the machine learning algorithm is a supervised learning algorithm, unsupervised learning algorithm, reinforcement learning algorithm, a deep learning algorithm, an artificial neural network algorithm, or other type of machine learning algorithm.

In some examples, the machine learning is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Example Modification of SSB Burst Parameter

Aspects of the present disclosure provide techniques for modifying SSB burst parameters. Modifying SSB burst parameters may include modifying SSB burst patterns, modifying beam power for certain SSB beams in an SSB burst, or a combination thereof. The techniques may be used, for example, to efficiently select a reduced set of beams for SSB bursts, which may allow for reduced monitoring time by a UE and/or free up resources (that would otherwise be used for SSB transmissions) for data transmissions. The techniques may also be used, for example, to select certain SSB beams (directions) to transmit with higher power and selecting certain other SSB beams to transmit with lower power. In some cases, using a reduced number of high power SSB beams may allow for reduced monitoring time by a UE, while still allowing some discovery in directions of SSB beams sent at lower power.

The SSB burst parameter modification may be based on a condition, such as UE or set of UEs being in a location(s) reachable by a reduced set of beams, or a time of day (e.g., night) in which there are only a few UEs in a given area (and UEs tend to be less mobile). In some cases, a full set of SSB beams may be used for discovery purposes (e.g., initial network acquisition) and a reduced set may be used after a UE is in connected mode.

As described above, a machine learning based algorithm may be trained to predict a set of (optimal/best) beams for a UE given position information. While such an algorithm may be used for the SSB burst parameter modification described herein, generally, any type of algorithm or logic may be used to determine how to modify an SSB burst parameter (e.g., to select a reduced number of beams and/or to select directions to transmit beams with low power and to select directions to transmit beams with high power).

FIG. 6 illustrates example operations 600 for wireless communications by a network entity. For example, operations 600 may be performed by a BS 110a (e.g., a gNB) of FIG. 1 or FIG. 2 to modify an SSB burst parameter, in accordance with certain aspects of the present disclosure.

Operations 600 begin, at 602, by detecting at least one condition. For example, the condition may involve at least one of time, location information for one or more UEs, direction information for the one or more UEs, or a transition of one or more user equipments (UEs) to or from an initial acquisition mode, idle mode, or connected mode.

At 604, the network entity modifies a synchronization signal block (SSB) burst parameter based on the detected condition. In some cases, an SSB burst pattern that identifies SSB positions for sweeping a set of SSB beams can be determined using the at least one condition.

At 606, the network entity transmits SSBs according to the modified SSB burst parameter. For example, SSB burst parameter may include a transmit power distribution across a set of SSB beams, and transmitting SSBs according to the modified SSB burst parameter may include a first subset of the SSB beams using a higher transmit power relative to a second subset of the set of SSB beams. For example, the network entity may modify an SSB burst pattern including at least one of an SSB duration, an SSB periodicity, or number of SSB beams swept.

Figure 7:
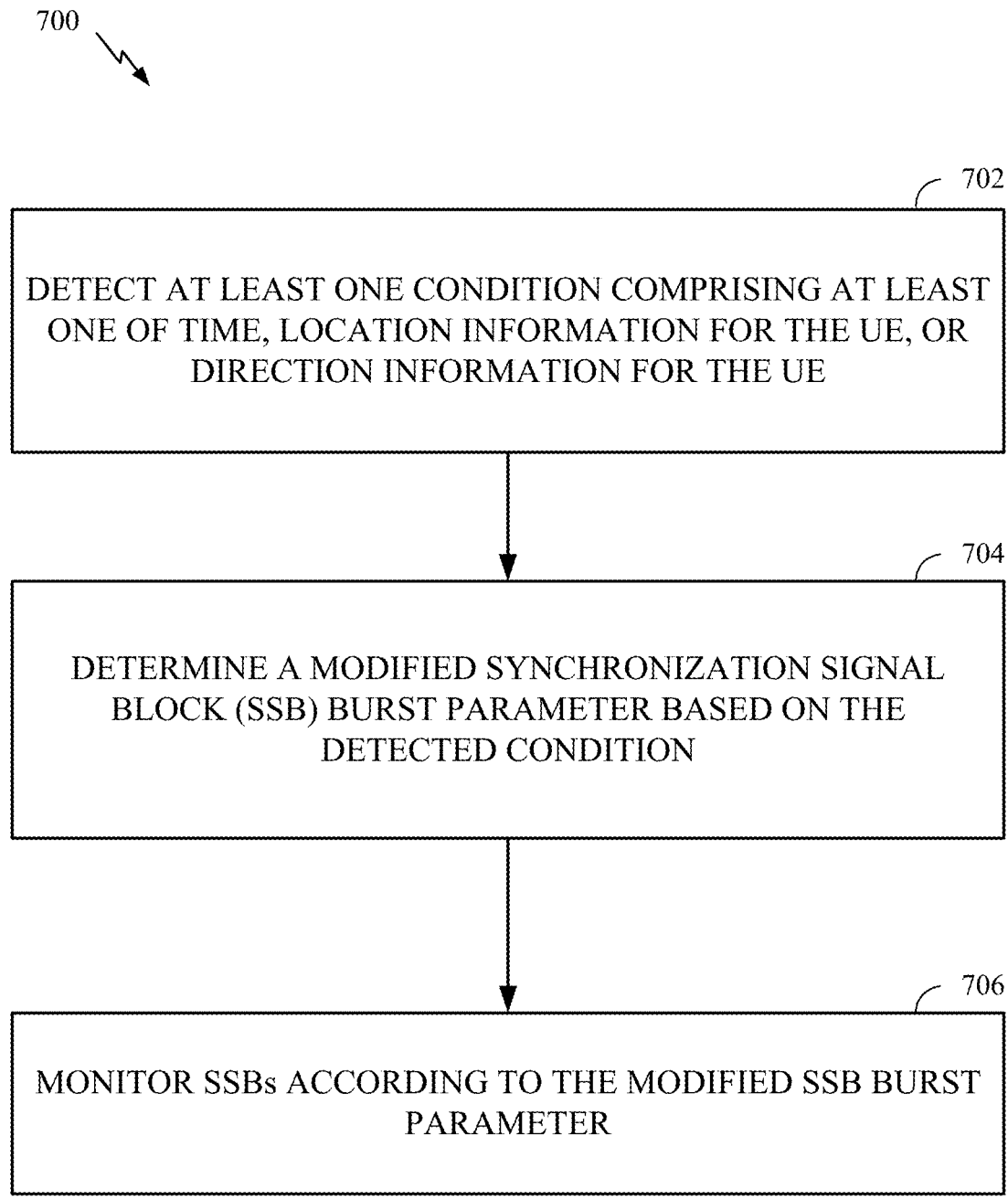
FIG. 7 illustrates example operations for wireless communication by a user equipment, in accordance with certain aspects of the present disclosure.

FIG. 7 illustrates example operations 700 for wireless communications by a UE that may be considered complementary to operations 600 of FIG. 6. For example, operations 700 may be performed by a UE 120a (e.g., a gNB) of FIG. 1 or FIG. 2 to monitor for SSBs according to an SSB burst parameter modified by a gNB performing operations 600 of FIG. 6.

Operations 700 begin, at 702, by detecting at least one condition. For example, the condition may involve at least one of time, location information for one or more UEs, direction information for the one or more UEs, or a transition of one or more user equipments (UEs) to or from an initial acquisition mode, idle mode, or connected mode.

At 704, the UE determines a modified SSB burst parameter based on the detected condition. The modified SSB burst parameter may be an SSB burst pattern that identifies SSB positions that a network entity uses for sweeping a set of SSB beams.

At 706, the UE monitors SSBs according to the modified SSB burst parameter. In this manner, a UE and gNB may be aligned regarding the modified SSB burst parameter, for example, allowing the UE to save power by reducing monitoring time and/or allowing the UE to receive downlink data during portions of an SSB burst that are no longer used for SSBs. In some cases, monitoring time may also be reduced by focusing on beams transmitted at higher power (and possibly monitoring for other SSB beams only if the higher power beams are not received with a certain RSRP or SINR). The UE may adjust at least one of SSB measurements or SSB measurement reporting based on the information. For example, the UE may apply scaling to measurements for SSB beams transmitted with lower power.

Operations 600 and 700 of FIGS. 6 and 7 may be understood with reference to the call flow diagrams shown in FIGS. 8-11. In other words, the gNB and UEs of FIGS. 8-11 may perform operations 600 and 700 of FIGS. 6 and 7.

Figure 8:
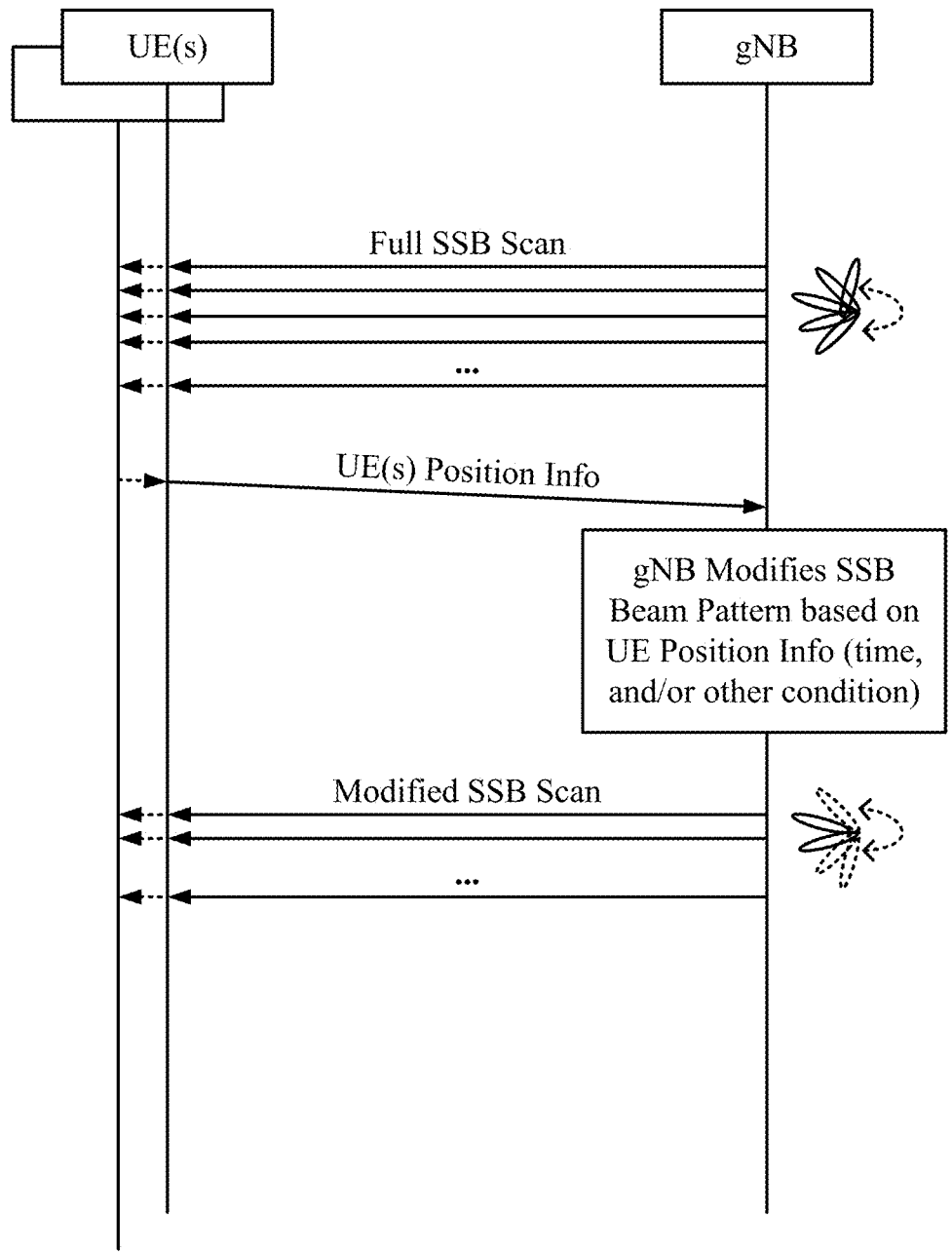
FIG. 8 is a call flow diagram illustrating one example of SSB burst modification, in accordance with certain aspects of the present disclosure.

As illustrated in FIG. 8, the gNB initially performs a full SSB scan sweeping all configured SSB beams (e.g., 64 SSBs) until a condition is met. Once the condition is met (e.g., based on UE position information or some other condition), the gNB modifies the SSB beam parameter, in this case, the SSB beam pattern. The gNB then performs a modified SSB scan, for example, sweeping a reduced set of SSB beams.

As noted above, the gNB may modify the SSB beam pattern based on UE position information (e.g., location, direction, and/or orientation). For example, based on the position information (obtained via GPS, reported by the UE, or determined via an LMF), the gNB may know there are only a few UEs at a given time (e.g., at night time), and use their location info to only transmit the SSB beams that those UEs need.

If the conditions change the SSB beam pattern may be modified again. For example, if a larger number of UEs are detected, chances are that all SSBs will be needed anyway (because different UEs need different beams) and the gNB can revert back to using a full SSB scan.

In some cases, the UE may receive information regarding the modified SSB burst pattern (e.g., as data set based on UE position information). In some cases, the UE may reduce monitoring and measuring time, for example, only measuring and reporting reference signal receiver power (RSRP) of the top-N, as indicated in the data-set. Thus, modifying a SSB burst pattern may result in lower latency, reduced power-consumption, and possibly reduced signaling overhead to send the reports.

As the techniques described herein potentially lead to fewer beams in an SSB burst, a corresponding reduction in SSB burst duration may also be achieved. The gNB can selectively send SSB beams in certain directions instead of sweeping all SSB beams. These SSB beams may be selected using any suitable algorithm. As noted above with reference to FIG. 5, in some cases, the SSB beams may be derived by an ML beam prediction algorithm. Any such algorithm may provide, as output, a set of beams with high probabilities of reaching a UE (not necessarily highest probabilities) and may lower the other beam probabilities (e.g., to zero as those beams are not likely to be used).

Figure 9:
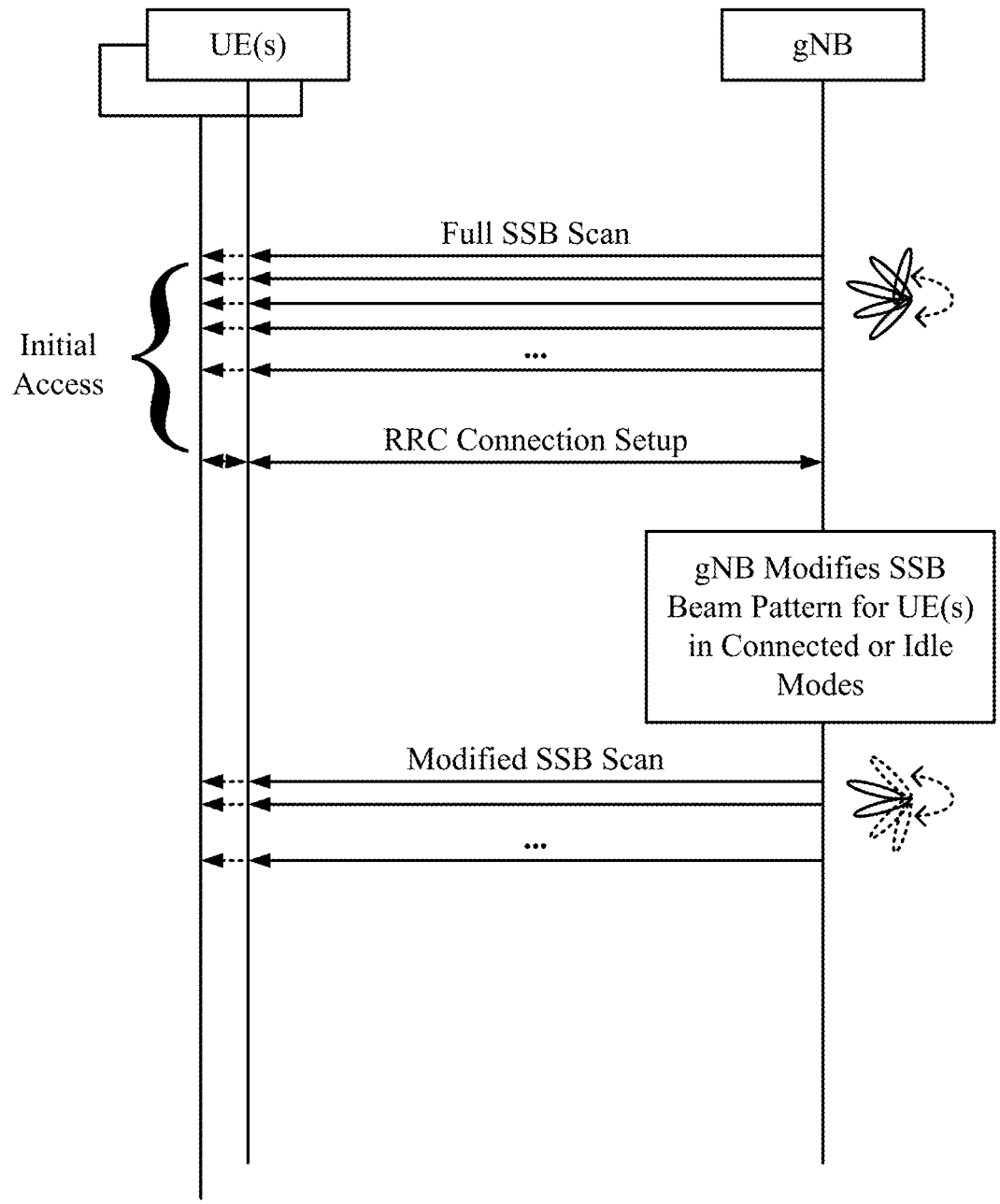
FIG. 9 is a call flow diagram illustrating another example of SSB burst modification, in accordance with certain aspects of the present disclosure.

As illustrated in the call flow diagram of FIG. 9, in some cases, different SSB burst patterns may be used depending on a connected mode of one or more UEs. For example, different SSB burst patterns may be used depending on whether the UEs are performing an initial network acquisition, are in an idle mode, or a connected mode.

As illustrated in FIG. 9, the gNB may use a full SSB scan for UEs during an initial access period. Once in a connected mode or an idle mode, the gNB may infer SSB beam directions of the UEs (e.g., through an ML algorithm), so it may use a modified SSB scan. For example, the gNB may use a modified SSB burst pattern with reduced SSB burst duration at night time.

While the gNB may transition to using an SSB scan with reduced SSB beams, it may still (at least occasionally) perform an SSB scan with a full set of SSB beams to discover new UEs (e.g., UEs in the initial acquisition mode). In some cases, this full SSB scan may be performed periodically, even after some UEs transition to idle or connected mode.

An SSB burst pattern may be modified for various other scenarios. For example, for a dual-connectivity scenario (e.g., with a UE connected via different RATs), the gNB may infer SSB beam directions of the UEs (e.g., through an ML-based or other type algorithm), so it may use a reduced SSB burst duration.

In some cases, to align the UEs and gNBs regarding the SSB burst pattern, information regarding the SSB burst patterns may be broadcast. For example, time and duration for SSB bursts using a particular SSB burst pattern can be broadcast in system information (e.g., in system information blocks SIBs). In some cases, rather than broadcasting, such information may be conveyed or preconfigured, for example, using programmed rules that does not require broadcasting for updated information. In such cases, information such as number, duration, or periodicity of a beam pattern predetermined rather than gathering system information.

In either case, the broadcast information may indicate that an SSB burst pattern (e.g., with a given SSB duration) can be a function of time (of day). For example, an SSB pattern may sweep more beam directions (e.g., 40 SSBs) during the day and sweep less beam directions (e.g., 10 SSBs) at night.

In some cases, a UE can use such information to plan mobility events. For example, a UE may consider such information when making handover decisions such as proactively initiating a handover to a gNB that offers regular service (e.g., full SSB scans with no SSB burst pattern modification) for performance reasons.

In some cases, a gNB may determine a modified SSB beam pattern in a data-driven manner, for example, by analyzing historical data (e.g. usage statistics of SSB beams). For example, a gNB can monitor the SSB beams in a given period of time (e.g., night time) and create a histogram of some number (e.g., 64) of SSB beams over that period of time. An analysis of this data may indicate that many of the SSB beams are under-utilized (e.g., meaning there are no UEs in that direction).

In some cases, a gNB may learn a corresponding pattern over time, and change SSB burst pattern (duration) accordingly. For example, if certain SSB beam indices are very rarely (or never) used in a period of time, the gNB can change the SSB burst pattern (duration) accordingly. In some cases, this type of modification may not necessarily be related to positioning, but may use some other type of information (e.g., connected status, time of day, or direct feedback from a UE).

In general, various decisions related to UE location and/or SSB beam modification may happen at multiple nodes within a wireless network. For example, a beams-per-location database (e.g., such as shown in FIG. 5) may be located at a gNB or at a central server (e.g., an AI-based server) which does the training. In some cases, a gNB scheduler may perform the beam scheduling/assignment (e.g., both for beam training and for data communication).

In some cases, position/location computation may be performed at the UE, the gNB, or a location server (e.g., a LMF in 5G). Corresponding positioning messaging/reporting may need to be sent to the relevant node, depending on where the decisions are being made. Such messages may be routed through other nodes. For example, such message may be sent to a gNB, which then passes such messages on to a server (e.g., an AI-based server). In other cases, such messages may be sent to a server, via a gNB, but in a message the gNB is unable to decode (in a message referred to as a 'containerized' message). Such messages may be used to carry positioning reports in certain protocols, such as LTE positioning protocol (LPP), which utilizes RRC messages between a UE and LMF. In some cases, an LMF may be located at a gNB. In such cases, the LPP protocol may still be used or faster (lower-layer) reports may be sent to the gNB (e.g., via physical (PHY) layer 1 (L1) or MAC-CE signaling), instead of containerized RRC messages.

Figure 10:
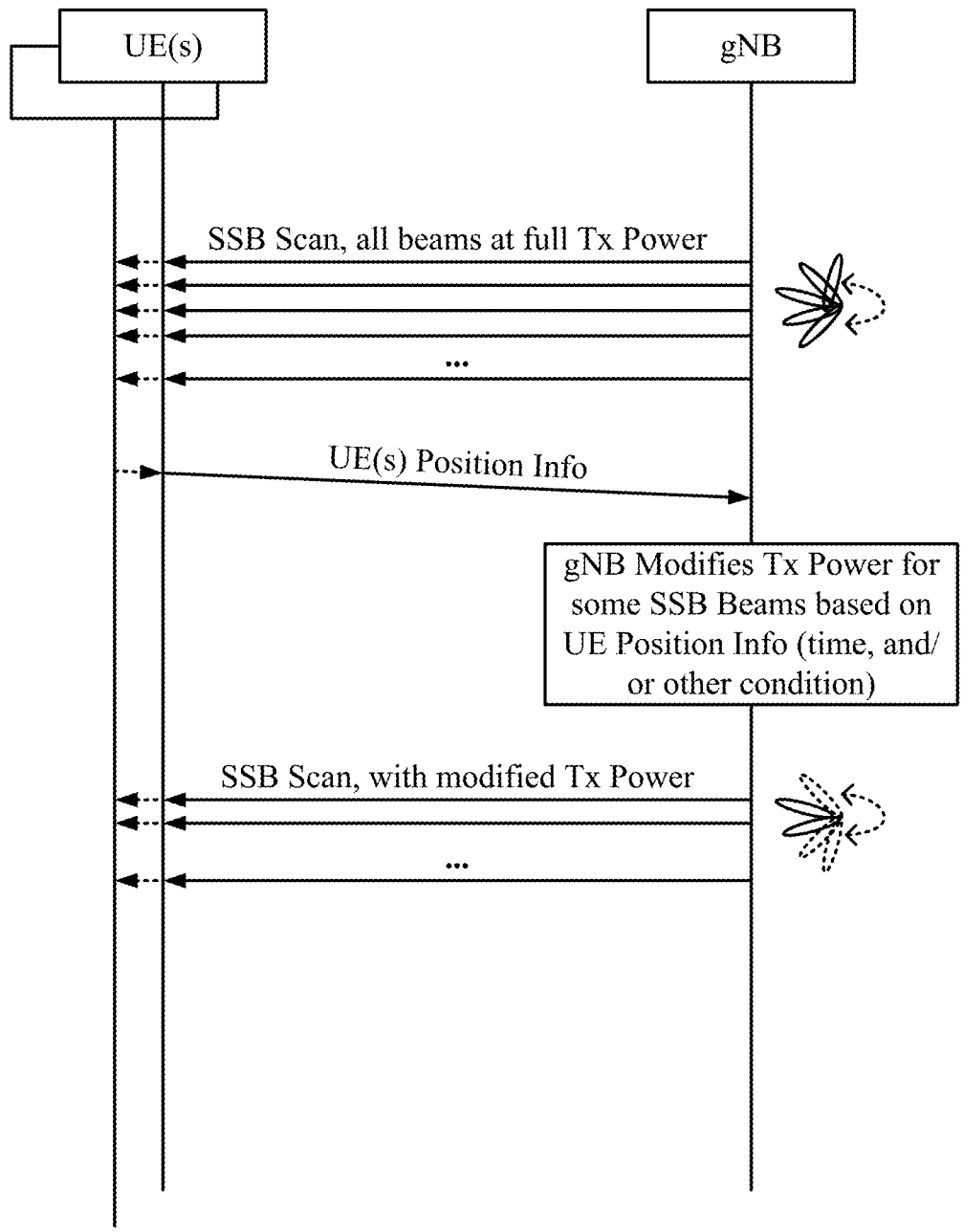
FIG. 10 is a call flow diagram illustrating one example of SSB beam power modification, in accordance with certain aspects of the present disclosure.

As illustrated in FIG. 10, the gNB initially performs a full SSB scan, for example, sweeping all configured SSB beams (e.g., 64 SSBs) at full transmit power until a condition is met. Once the condition is met (e.g., based on UE position information or some other condition), the gNB selects certain SSB beams (a first subset) to transmit at higher power and certain SSB beams (a second subset) to transmit lower power beams.

As noted above, the gNB may determine the first subset of SSB beams based on at least one of time or UE position information (e.g., location, direction, and/or orientation) for one or more UEs. For example, based on the position information (e.g., obtained via GPS, reported by the UE, or determined via an LMF), the gNB may know there are only a few UEs at a given time (e.g., at night time), and use their location information to only transmit preferred SSB beams (predicted based on the location information) with higher power to those UEs need and lower power in lower probability (e.g., medium probability) directions. In such cases, the same number of SSBs may be transmitted, however, the power to a subset of the SSB beams is adjusted. Thus, it is possible to continue discovery of UEs in the low probability directions, when compared to not sending any beams at all in those directions.

In some cases, the network entity may modify at least one of an SSB duration, an SSB periodicity of equal power beams, an SSB periodicity of two different power beams, directions selected for high power beams, directions selected for lower power beams, or number of SSB beams per power level.

If the conditions change, the transmit power of SSB beams in SSB burst may be modified again. For example, if a larger number of UEs are detected, chances are that all SSBs with full power might be needed anyway (because different UEs need different beams) and the gNB can revert back to using a full SSB scan (e.g., with equi-power SSB beams).

In some cases, a full SSB burst with all SSB beams transmitted at full power may be done periodically, but less frequently than SSB bursts with only some SSB beams sent at full power. UEs may be informed of this periodicity so they can at least occasionally monitor full SSB scans as desired.

As the techniques described herein potentially lead to less energy transmitted to some beams in an SSB burst, and a corresponding reduction in frequency of full beam power sweeps and reduced monitoring time at the UE. The gNB can selectively send SSB beams of full power in certain directions instead of sweeping all SSB beams using full power. The remaining SSB beams may use low power beams. Selecting SSB beams for each subset of beams may be selected using any suitable algorithm. As noted above with reference to FIG. 5, in some cases, the SSB beams may be derived by an ML beam prediction algorithm. Any such algorithm may provide, as output, a subset of beams with high probabilities of reaching a UE (not necessarily highest probabilities) and may lower the other beam probabilities to transmit low power beams (e.g., to a non-zero probability as those beams with some likelihood of being used).

Figure 11:
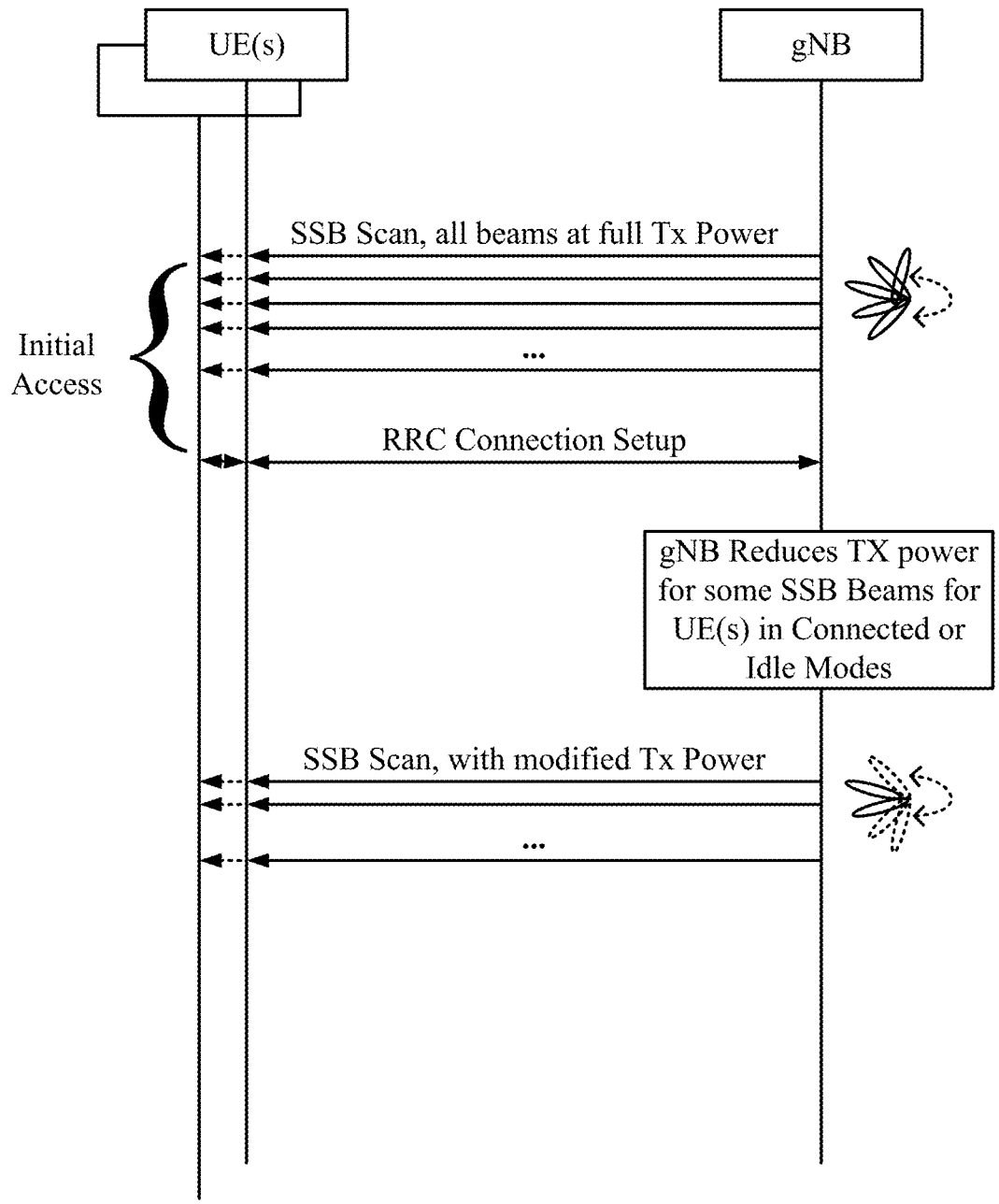
FIG. 11 is a call flow diagram illustrating another example of SSB beam power modification, in accordance with certain aspects of the present disclosure.

As illustrated in the call flow diagram of FIG. 11, in some cases different SSB burst powers may be used depending on a connected mode of one or more UEs (e.g., whether the UEs are performing an initial network acquisition, are in an idle mode, or a connected mode).

As illustrated in FIG. 11, the gNB may use a full SSB scan (e.g., full power for all SSB beams) for UEs during an initial access period. Once the UE(s) are in a connected mode or idle mode, the gNB may infer SSB beam directions of the UEs (e.g., through an ML algorithm), so the gNB may use a SSB scan having reduced power level for some SSB beams.

While the gNB may transition to using an SSB scan with reduced power level for some SSB beams, it may still (at least occasionally) perform an SSB scan with full power level for all SSB beams to discover new UEs (e.g., UEs in the initial acquisition mode). In some cases, this full power SSB scan may be performed periodically, even after some UEs transition to idle or connected mode.

An SSB burst pattern may be modified for various other scenarios. For example, for a dual-connectivity scenario (e.g., with a UE connected via different RATs), the gNB may infer SSB beam directions of the UEs (e.g., through an ML-based or other type algorithm), so it may use a reduced SSB burst duration.

In some cases, to align the UEs and gNBs regarding the SSB scan timing and/or transmit power levels information may be broadcast, such as through system information blocks (SIBs). This information may, for example, indicate which SSB beams are in the first set of SSB beams and a difference in transmit power used for the first set of SSB beams and the second set of SSB beams (and possibly scheduling of reduced power SSB scans and full SSB scans). The information may identify the first subset of SSB beams by one or more beam indexes or one or more beam index sets. Additionally, or alternatively, the information may indicate a scaling factor used to derive the transmit power used to transmit SSBs with the second subset of SSB beams from the transmit power used to transmit SSBs with the first subset of SSB beams. For example, information such as signal receive power (RSRP) measurements can be reported for more than one beam in a single instance, such as 1 (e.g., strongest beam) to 4 beams (e.g., adequately strong beams) along with a differential RSRP measurement for the rest of the beams. During reporting the UE may indicate a scaling factor used to derive the transmit power used to transmit SSBs with the second subset of SSB beams from the transmit power used to transmit SSBs with the first subset of SSB beams. As an alternative, the gNB and UE may infer the scaling factor based on a broadcast difference in transmit power or the scaling factor may be provided to the UE.

In some cases, rather than broadcasting, such information may be conveyed or preconfigured, for example, using programmed rules that does not require broadcasting for updated information. In such cases, information such as number, duration, periodicity of a beam pattern having equal power beams, or periodicity of a beam pattern having two or more power beams, are predetermined rather than gathered system information.

In either case, such information may indicate that a modified power SSB burst (e.g., with a given SSB duration) can be a function of time (of day). For example, an SSB pattern may sweep more beam directions having high power beams (e.g., 40 SSBs) during the day and sweep less beam directions using high power beams (e.g., 10 SSBs) at night. Additionally, a reduced SSB burst duration can be used in combination with the different power levels at night time. Additionally, a full sweep periodicity can be reduced during daytime and increased at night time, with inverse periodicity behavior for first and second subset of beam transmissions relative to time of day.

In some cases, a UE can use such information to plan mobility events. For example, a UE may consider such information when making handover decisions such as proactively initiating a handover to a gNB that offers regular service (e.g., full power SSB scans with no beam power burst modification) for performance reasons.

In some cases, a gNB may determine the first subset of SSB beams in a data-driven manner, for example, by analyzing historical data (e.g. usage statistics of SSB beams). For example, a gNB can monitor the SSB beams in a given period of time (e.g., night time) and create a histogram of some number (e.g., 64) of SSB beams over that period of time. An analysis of this data may indicate that many of the SSB beams are frequently utilized in a first direction, moderately-utilized in a second direction, and under-utilized in a third direction (e.g., high number of UEs in a first direction, some UEs in a second direction, and no UEs in a third direction). The analysis may include determining usage statistics of SSB beams of the SSB burst pattern, selecting as the first subset of SSB beams, SSB beams that are more frequently used than other SSB beams, and selecting, as the second subset of SSB beams, SSB beams that are less frequently used than the first subset of SSB beams.

In some cases, a gNB may learn a corresponding pattern over time, and change SSB burst directions to transmit high power beams accordingly. For example, if certain SSB beam indices are very rarely (or never) used in a particular direction during a particular period of time, the gNB can change the SSB burst power to transmit at lower powers accordingly. In some cases, this type of modification may not necessarily be related to positioning, but may use some other type of information (e.g., connected status, time of day, or direct feedback from a UE).

In general, various decisions related to UE location and/or SSB beam modification may happen at multiple nodes within a wireless network. For example, a beams-per-location database (e.g., such as shown in FIG. 5) may be located at a gNB or at a central server (e.g., an AI-based server) which does the training. In some cases, a gNB scheduler may perform the beam scheduling/assignment (e.g., both for beam training and for data communication).

In some cases, position/location computation may be performed at the UE, the gNB, or a location server (e.g., a LMF in 5G). Corresponding positioning messaging/reporting may need to be sent to the relevant node, depending on where the decisions are being made. Such messages may be routed through other nodes. For example, such message may be sent to a gNB, which then passes such messages on to a server (e.g., an AI-based server). In other cases, such messages may be sent to a server, via a gNB, but in a message the gNB is unable to decode (in a message referred to as a 'containerized' message). Such messages may be used to carry positioning reports in certain protocols, such as LTE positioning protocol (LPP), which utilizes RRC messages between a UE and LMF. In some cases, an LMF may be located at a gNB. In such cases, the LPP protocol may still be used or faster (lower-layer) reports may be sent to the gNB (e.g., via physical (PHY) layer 1 (L1) or MAC-CE signaling), instead of containerized RRC messages.

Example Identification of Beams for
Communications with a User Equipment (UE)
Based on a Predicted Mobility State of the UE Various aspects of the present disclosure relate to the selection of beams for communications to and from a UE and a network entity based on predicted mobility state information for a user equipment (UE).

Generally, the beams may be selected based on information reported by the UE, such as the location of the UE or other position information from the UE. This information may include, for example, an orientation, or information associated with a change in position (for example, a direction of movement). In some implementations, a network entity can use the predicted mobility state information for the UE, position information for the UE, and a machine learning model to predict a set of beams that may be suitable for communications to and from the UE and the network entity, which may be a subset of the beams that the network entity can generally use for communications to and from the UE and the network entity. Further, the network entity can use the predicted mobility state information for the UE to adjust a periodicity at which SSB bursts are transmitted to a UE.

As described above, a machine learning based algorithm may be trained to predict a set of (optimal/best) beams for a UE given the position of the UE at any particular time. The machine learning based algorithm may be trained prior to regular operations at the network entity and deployed to the network entity once trained and verified. Over time, the training data set used to train the machine learning based algorithm may be augmented with updated information correlating UE position information and the set of (optimal/best) beams for the UE. As the training data set is augmented, a system can retrain the machine learning based algorithm and may deploy the retrained machine learning based algorithm to the network entity for use in subsequent predictions of a set of beams for a UE given the position of the UE at any particular time in the future.

According to particular aspects, a UE may predict, estimate or otherwise determine (hereinafter used interchangeably where appropriate) the mobility state of the UE for a future period of time and report the predicted mobility state of the UE to a network entity. The UE may predict the mobility state of the UE using a machine learning model trained to predict whether the UE is moving or stationary based on various information, such as sensor data, time information, and location or other position information, among other examples. The UE may additionally or alternatively predict the mobility state of the UE using other contextual information, such as signal quality measurements. The UE may report the predicted mobility state of the UE and position information associated with the UE to a network entity for use by the network entity in identifying beams to use for communications between the UE and the network entity.

In some aspects, the network entity may receive the predicted mobility state of the UE and also use the predicted mobility state to modify an SSB burst pattern, SSB burst timing, or other SSB-related parameters. Generally, the network entity may use a machine learning model to predict the best beams for communicating with the UE based on the predicted mobility state and position information associated with the UE. When the predicted mobility state indicates that the UE is likely to be stationary, the network entity may adjust a periodicity for transmitting SSB bursts to a UE to transmit SSB bursts less frequently, based on an assumption that the quality or reliability of the beams selected for communications between the UE and the network entity are likely to remain the same. Meanwhile, when the predicted mobility state indicates that the UE is likely to be in motion, the network entity may adjust a periodicity for transmitting SSB bursts to a UE to transmit SSB bursts more frequently, based on an assumption that beams selected for communications between the UE and the network entity at an earlier point in time are not likely to be the best beams for communications between the UE and the network entity at a later point in time.

Figure 12:
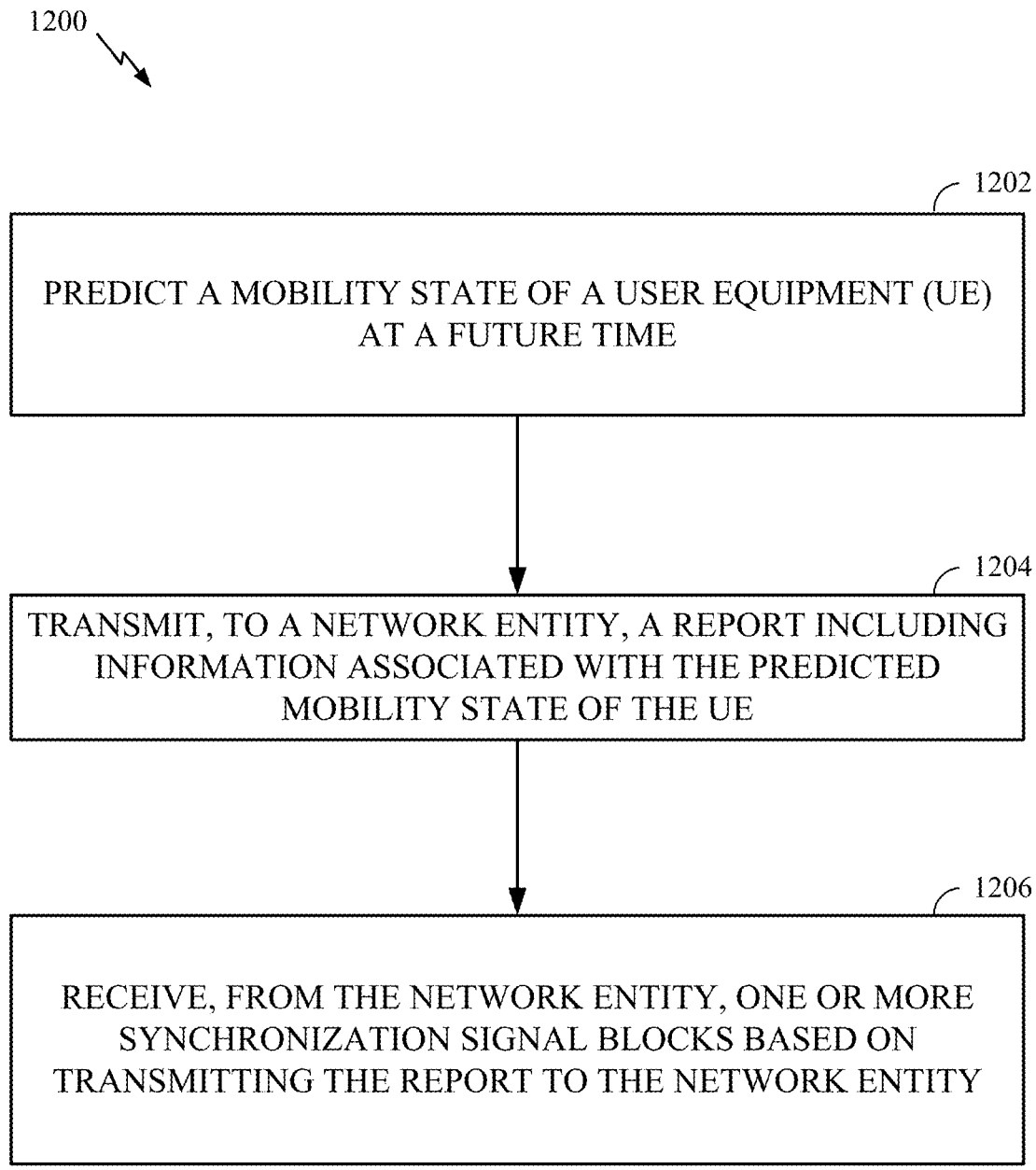
FIG. 12 illustrates example operations for wireless communication by a user equipment.

FIG. 12 shows a flowchart illustrating an example process 1200 for wireless communication by a user equipment that supports beam selection based on predicted mobility state information for a user equipment (UE), in accordance with some aspects of the present disclosure. The operations of process 1200 may be implemented by a wireless communication device or its components as described herein. For example, process 1200 may be performed by a UE 120a of FIG. 1 or FIG. 2 to report position information (including location information as well as, in some examples, orientation information) to a network entity, and to receive a modified SSB burst pattern based on the predicted mobility state information for the UE, in accordance with some aspects of the present disclosure.

In some implementations, process 1200 begins in 1202 with the UE predicting a mobility state of the UE at a future time. For example, the future time may be a preconfigured offset relative to the current time or other reference time, such as 10 milliseconds, 100 milliseconds, 1000 milliseconds, or more from the reference time. In some implementations, the process 1200 may be repeated and the amount of time between a current or reference time and the future time may increase after each instance in which the UE predicts the same or a similar mobility state. A mobility state may be defined in various manners. For example, a UE may be in a "stationary" mobility state if the position of the UE changes by less than a threshold amount over a period of time, such as if a UE remains in a particular room or subdivision of a building, if the latitude and longitude of the UE changes by less than a threshold amount over time, or similar scenarios in which a UE remains in substantially the same location over the period of time. Likewise, a UE may be in an "in motion" mobility state if the position of the UE changes by more than the threshold amount over the period of time. For example, a UE may be in a motion mobility state if the UE moves from a first room to a second room in a building, if the latitude and longitude of the UE changes by more than a threshold amount over time, or if other scenarios exist in which a UE substantially changes location over time.

As described above, in some examples, the UE may predict its mobility state based on a machine learning model that is trained to output a prediction, or information that may be used by the UE to predict, whether the UE will be stationary or moving (and in some examples also information characterizing such motion) based on time and location information (either instantaneous or obtained over time). For example, a machine learning model may learn locations and times at which a UE is stationary (for example, the machine learning model may learn that the UE is typically stationary at night in a particular location, which may be in the living room of a house) and locations and times at which a UE is in motion (for example, the machine learning model may learn that the UE is typically in motion during particular time periods, which may be associated with commuting in a vehicle to work in the morning and in the evening). The machine learning model may be trained using supervised learning techniques in which a training data set used to train the machine learning model includes time and location information associated with a tag, label or other reference indicating whether the UE is stationary or in motion. In some implementations, the UE may predict the mobility state of the UE based on contextual information, such as signal quality measurements for signals from a plurality of gNBs, such as reference signal received power (RSRP) or received signal strength indicator (RSSI) measurements for reference signals transmitted or broadcast by the plurality of gNBs, as discussed in further detail below.

At 1204, the UE transmits, to the network entity, a report including information associated with the predicted mobility state of the UE. For example, the information in the report may include an indication of the predicted mobility state (for example, "stationary" or "in motion") as well as, in some examples in which the UE is in motion, information characterizing the motion (for example, a velocity or direction of motion). In some specific examples, the information associated with the predicted mobility state of the UE may include a binary indication in which a first value indicates that the predicted UE mobility state is stationary and a second value indicates that the predicted UE mobility state is not stationary. In some specific examples, the information may further include a probability value indicating a likelihood that the UE will be stationary or in motion at a future time. The UE may transmit the report to the network entity using, for example, radio resource control (RRC) signaling, a medium access control (MAC) control element (CE) (MAC-CE), uplink control information (UCI), or other uplink signaling in which a UE can transmit information to a network entity (for example, in a signal carried on a physical uplink shared channel (PUSCH)). In some implementations, the report may include position information, such as a geographic location of the UE and UE orientation information, that the network entity can use to select beams on which SSBs are to be transmitted to the UE.

At 1206, the UE receives, from the network entity, one or more SSBs based on transmitting the report to the network entity. For example, the network entity may broadcast a set of SSBs associated with the beams predicted to be the best beams for communications between the UE and the network entity, as discussed in further detail below. If the predicted mobility state of the UE indicates that the UE is predicted to be stationary, the one or more SSBs may be the same as SSBs previously transmitted to the UE. If the predicted mobility state of the UE indicates that the UE is predicted to be in motion, the one or more SSBs may be SSBs associated with beams predicted to be the best or optimal beams based on position information associated with the UE (which, as discussed above, may be communicated to the network entity in conjunction with or separate from the predicted mobility state). The position information associated with the UE may include, for example, a location determined based on a satellite position system, time distance of arrival (TDOA) information, or other techniques for determining a location of the UE.

Figure 13:
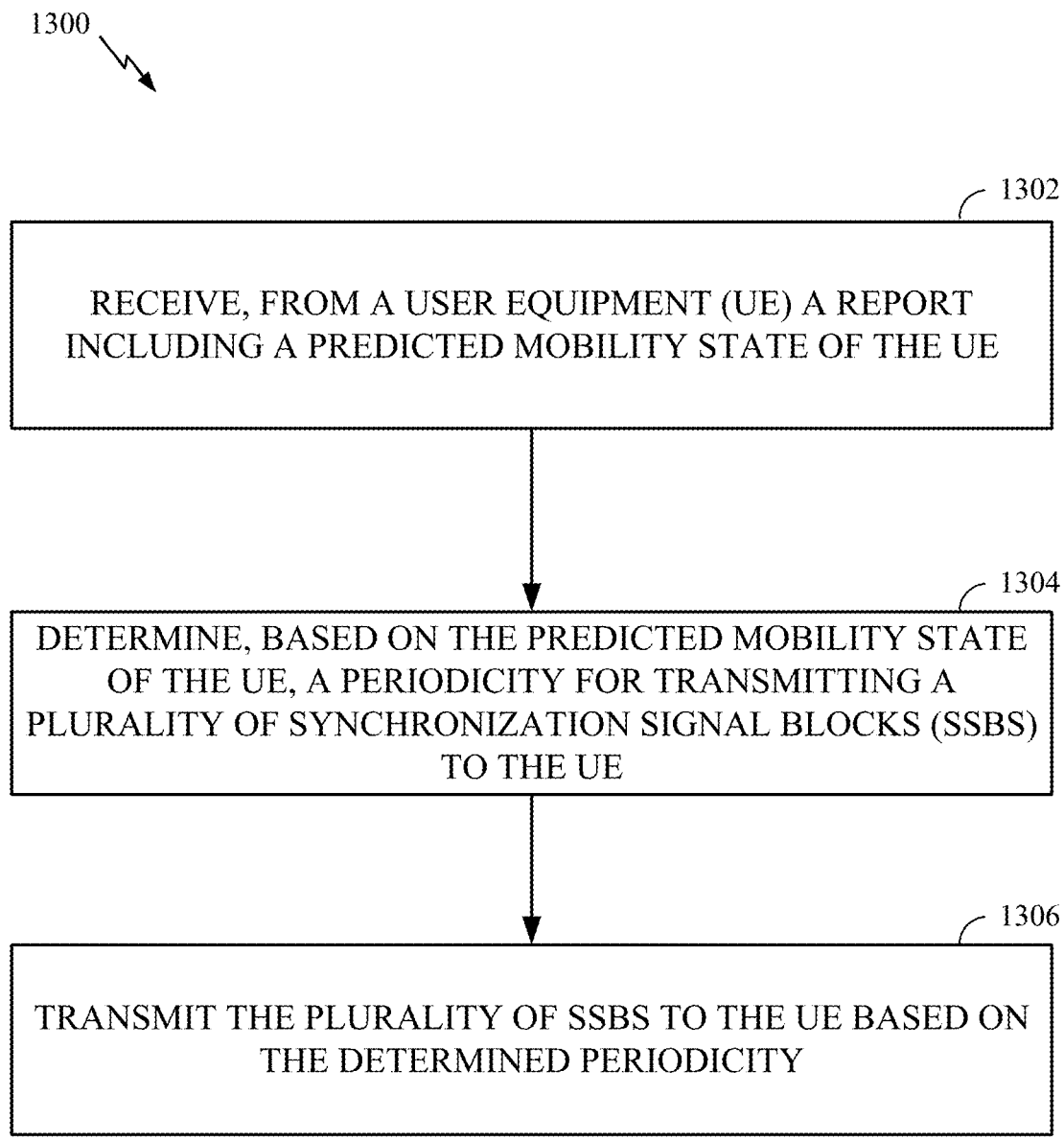
FIG. 13 illustrates example operations for wireless communication by a network entity, in accordance with certain aspects of the present disclosure.

FIG. 13 shows a flowchart illustrating an example process 1300 for wireless communications by a network entity that supports beam selection based on predicted mobility state information for a user equipment (UE). Process 1300 may be considered complementary to process 1300 of FIG. 13. The operations of process 1300 may be implemented by a wireless communication device or its components as described herein. For example, the operations of process 1300 may be performed by a base station 120a (for example, a gNB) of FIG. 1 or FIG. 2 to receive quantized orientation information and modify an SSB burst pattern based on the received quantized orientation information reported by a UE performing process 1300 of FIG. 13.

In some implementations, process 1300 begins, at 1302, with the network entity receiving, from a user equipment (UE), a report including information associated with a predicted mobility state of the UE. The network entity may receive the report in various types of uplink signaling from the UE, such as in radio resource control (RRC) signaling, a medium access control (MAC) control element (CE) (MAC-CE), uplink control information (UCI), or other uplink signaling in which a UE can transmit information to a network entity (for example, a signal carried on a physical uplink shared channel (PUSCH)). The information associated with a predicted mobility state of the UE may generally indicate whether the UE is predicted to be in a "stationary" mobility state or in an "in motion" mobility state. In some implementations, the report may also include position information associated with the UE, which the network entity can use to identify a set of beams to use in transmitting SSBs to the UE (for example, a set of predicted best beams for communications to and from the UE and the network entity).

At 1304, the network entity determines, based on the predicted mobility state of the UE, an SSB pattern and a periodicity for transmitting a plurality of synchronization signal blocks (SSBs) to the UE. In some implementations, the gNB may use position information for the UE to predict a new set of beams on which to transmit the plurality of SSBs. The predicted new set of beams may be a set of beams identified by a machine learning model given the position information for the UE, and the set of beams may be the beams predicted by the machine learning model to be the best beams for use in communications to and from the network entity and the UE. In some implementations, the network entity may not have current position information for the UE. However, if the UE reports a predicted mobility state of "in motion," the network entity can determine that the current set of beams used for communications to and from the UE and the network entity may not be relevant in the future and may initiate an SSB burst over at least some of the possible beam directions on which the network entity can communicate with the UE. If, conversely, the UE reports a predicted mobility state of "stationary," the network entity can determine that the beams that are currently used to communicate with the UE are likely to be the best beams, or at least suitable beams, for communications between the network entity and the UE in the future (though, in some situations where the UE is rotating or there is a change in the environment in which the UE is operating, the beams currently used to communicate with the UE may not be the best beams in the future).

In some implementations, the periodicity may be based on the predicted mobility state of the UE and the future time period for which the predicted mobility state of the UE is valid. The periodicity may further be based on previous predictions of the mobility state of the UE (for example, where a UE has consistently indicated that the UE is predicted to be stationary or in motion).

At 1306, the network entity transmits the plurality of SSBs to the UE based on the determined periodicity. In some implementations, the plurality of SSBs may be determined based on the predicted mobility state of the UE and position information associated with the UE. For example, if the predicted mobility state of the UE is stationary, the network entity can use previously reported location information to identify the plurality of SSBs to transmit to the UE. The identified plurality of SSBs may be, for example, the SSBs transmitted on beams previously predicted to be the best or optimal beams for communications between the UE and the network entity.

Figure 14:
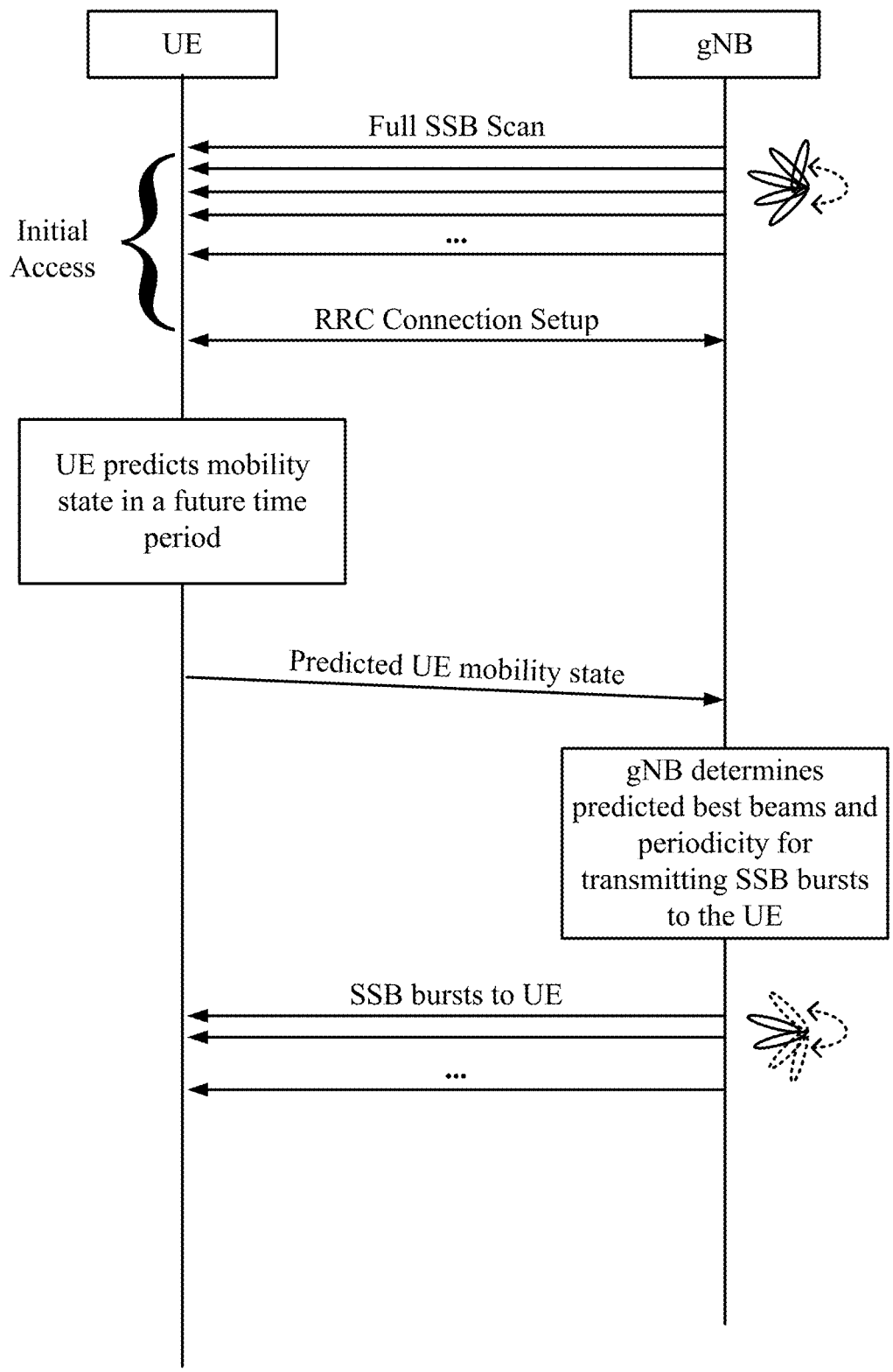
FIG. 14 shows a call flow diagram illustrating an example of UE orientation information reporting and beam prediction that supports beam selection based on predicted mobility state information for a user equipment (UE), in accordance with some aspects of the present disclosure.

Operations 1200 and 1300 of FIGS. 12 and 13 may be understood with reference to the call flow diagram shown in FIG. 14. In other words, the gNB and UEs of FIG. 8 may perform operations 1200 and 1300 of FIGS. 12 and 13.

FIG. 14 shows a call flow diagram illustrating an example of UE orientation information reporting and beam prediction by devices in a wireless communications network that supports beam selection based on quantized orientation information for a user equipment (UE), in accordance with some aspects of the present disclosure.

As illustrated in FIG. 14, the gNB may use a full SSB scan for UEs during an initial access period. Once in a connected mode or an idle mode, the gNB may infer SSB beam directions of the UEs (e.g., through an ML algorithm), so it may use a modified SSB scan. For example, the gNB may use a modified SSB burst pattern with reduced SSB burst duration at night time.

Subsequently, the UE may predict a mobility state at a future time. The UE may predict a mobility state in the future time period using a machine learning model trained to predict whether the UE will be stationary or in motion based on various inputs, such as time and location information. In some implementations, a prediction that the UE will be stationary may be a prediction that the UE will remain within a particular area, such as within a room. The UE can determine a location of the UE for use in predicting the mobility state at a future time based on various signals, such as signals from a satellite position system (for example, NAVSTAR GPS, GALILEO, or other satellite position systems, whether global or regional in coverage), signals identifying a room in a building that the UE is located in, or the like. The UE can also or alternatively determine a location of the UE based on sensor data from the UE. For example, the UE can determine a location of the UE based on a previously determined location and historical movement data from accelerometers, gyroscopes, and other movement and orientation sensors in a UE.

In some implementations, the UE may predict a mobility state in the future time period using contextual information, such as signal strength of one or more signals received or detected at the UE. The network entity (e.g., the gNB illustrated in FIG. 14) can configure the UE with information identifying a plurality of network entities in the vicinity of the UE (e.g., a set of gNBs) and signals to monitor from each of the plurality of network entities. The UE may measure or otherwise determine a signal quality metric, such as reference signal received power (RSRP) or received signal strength indicator (RSSI), for signals from each of the plurality of network entities and compare the measured or determined signal quality metric to historical signal quality metric. If the historical and measured signal quality metric is the same or substantially similar (for example, within a threshold percentage), the UE can predict that the UE will be stationary; otherwise, the UE can predict that the UE will be in motion.

The UE may transmit a report including information associated with the predicted mobility state of the UE to the gNB. The gNB may use the report to determine a periodicity for transmitting SSB beams to the UE. Generally, the gNB may lengthen a gap between SSB bursts when a UE reports a predicted mobility state of stationary and may shorten a gap between SSB bursts when a UE reports a predicted mobility state of in motion. In some implementations, the gNB may determine the periodicity for transmitting SSB beams to the UE based on additional motion information, such as a speed and direction of travel.

In some implementations, the gNB may use position information (such as UE location) reported by the UE to predict the best beams for communications between the UE and the gNB. As discussed above, the gNB can use a machine learning model to predict which beams are the best or optimal beams for communications between the UE and the gNB. The machine learning model may output the best beams for a given location as input or may output a probability distribution over all beam directions that the gNB can use to identify the best beams.

After determining the periodicity for transmitting SSB beams to the UE and the predicted best beams for communications between the UE and the gNB, the gNB can transmit the plurality of SSBs to the UE using the predicted best beams and the determined periodicity. In some implementations, the gNB may provide information to the UE about the SSB burst pattern to be used in transmitting SSB beams to the UE. This information may be transmitted by the gNB, for example, in one or more system information blocks (SIBs) and may include information identifying a starting time at which the SSB burst is transmitted and a number of SSBs that are transmitted. As discussed, by adjusting the periodicity of SSB transmissions and by predicting the best beams for use in communications between the UE and the gNB, aspects of the present disclosure may provide for reductions in power usage by UEs by decreasing the number of times the UE attempts to detect SSB transmissions when the UE is stationary and by reducing the number of SSB transmissions to detect.

In some implementations, the network entity can determine, based on the position of the UE or previous UE position information and the predicted mobility state of the UE, an SSB pattern including the plurality of SSBs to transmit and a transmit power for each of the plurality of SSBs. For example, at times when the UE is predicted to be stationary, the network entity can adapt the SSB pattern so that an SSB is performed without sweeping over all possible beams on which the network entity can transmit, which may reduce the overhead imposed on a UE to perform beam management.

In some implementations, predictions of a UE mobility state may be triggered periodically. A UE may receive a triggering message periodically to predict the mobility state of the UE or may be otherwise configured to predict the mobility state of the UE periodically. In response to receiving the triggering message or otherwise being triggered on a periodic basis, the UE may determine the mobility state of the UE.

In some implementations, predictions of a UE mobility state may be triggered based on the occurrence of one or more predefined triggering events. When a UE identifies an occurrence of one of these one or more predefined triggering events, the UE determines the mobility state of the UE.

Example Communications Devices

Figure 15:
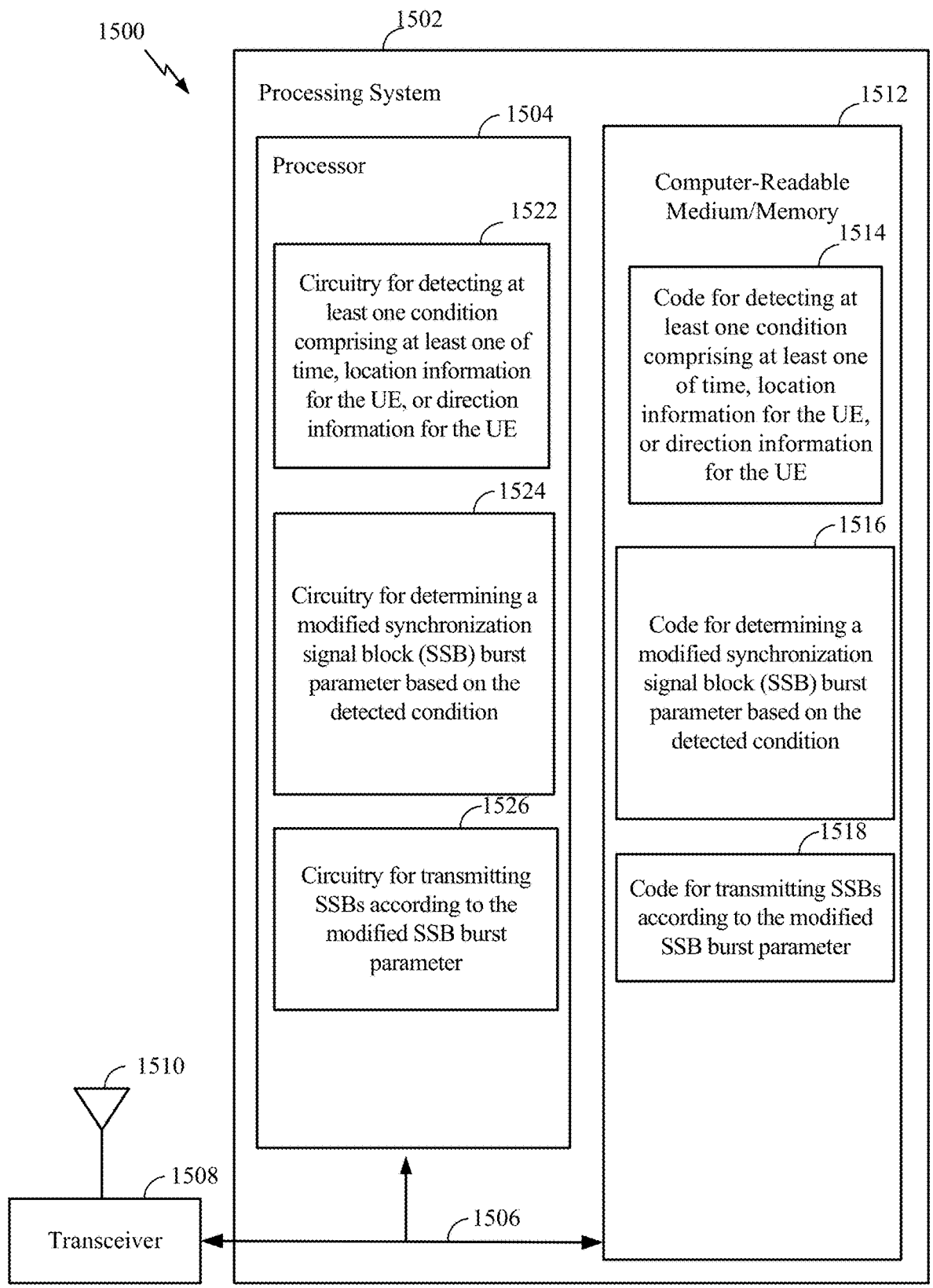
FIG. 15 illustrates a communications device that may include various components configured to perform operations for the techniques disclosed herein, in accordance with aspects of the present disclosure.

FIG. 15 illustrates a communications device 1500 (e.g., a base station such as a gNB) that may include various components (e.g., corresponding to means-plus-function components) configured to perform operations for the techniques disclosed herein, such as the operations illustrated in FIG. 6. The communications device 1500 includes a processing system 1002 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 6, or other operations for performing the various techniques discussed herein. In certain aspects, computer-readable medium/memory 1512 stores code 1514 for detecting at least one condition including at least one of time, location information for the UE, or direction information for the UE; code 1516 for determining a modified synchronization signal block (SSB) burst parameter based on the detected condition; and code 1518 for transmitting SSBs according to the modified SSB burst parameter. In certain aspects, the processor 1504 has circuitry configured to implement the code stored in the computer-readable medium/memory 1512. The processor 1504 includes circuitry 1018 for detecting at least one condition including at least one of time, location information for the UE, or direction information for the UE; circuitry 1520 for modifying a synchronization signal block (SSB) burst parameter that identifies SSB positions for sweeping a set of SSB beams based on the detected condition; and circuitry 1522 for transmitting SSBs according to the modified SSB burst parameter.

Figure 16:
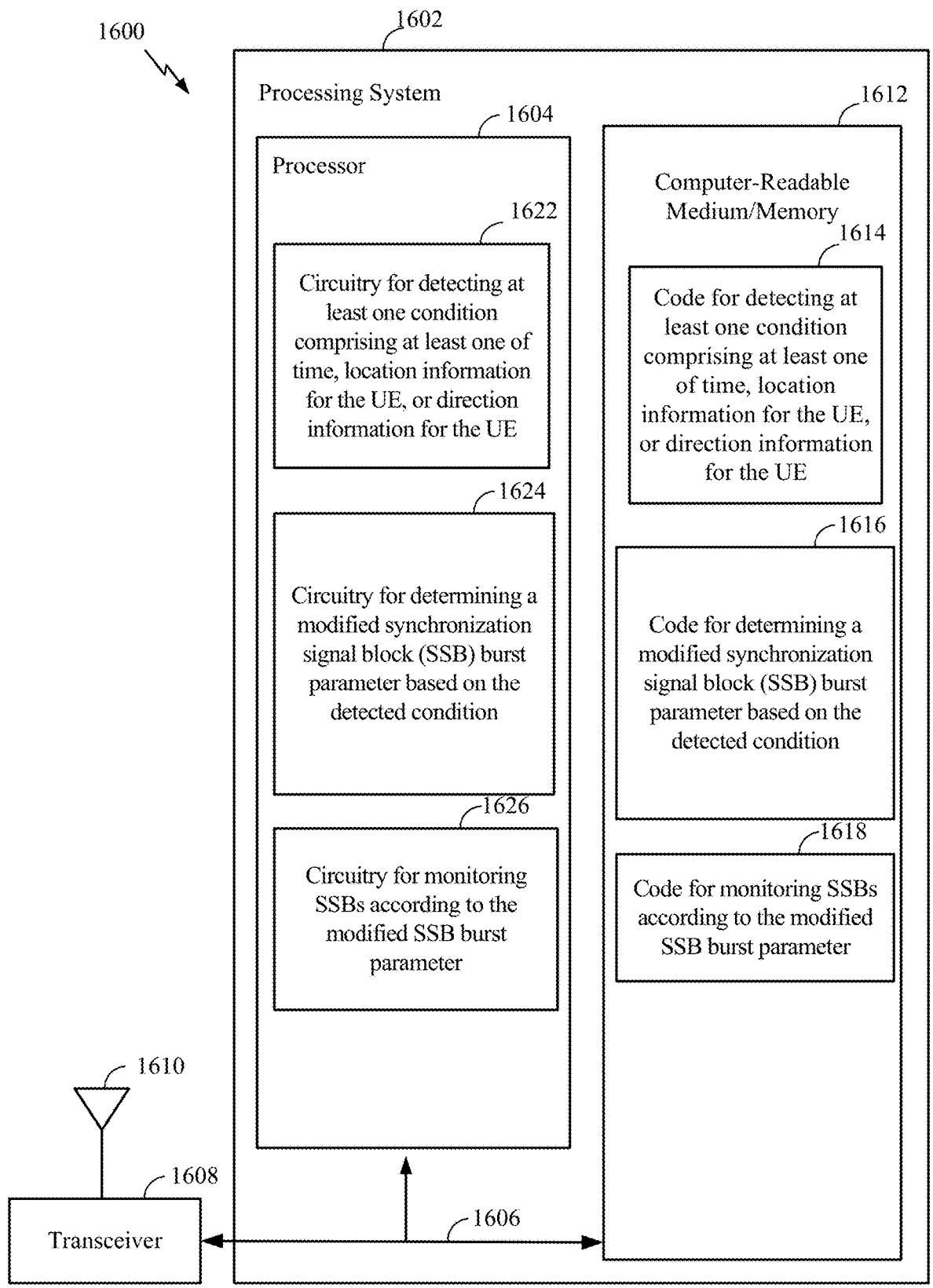
FIG. 16 illustrates a communications device that may include various components configured to perform operations for the techniques disclosed herein, in accordance with aspects of the present disclosure.

FIG. 16 illustrates a communications device 1600 (e.g., a UE) that may include various components (e.g., corresponding to means-plus-function components) configured to perform operations for the techniques disclosed herein, such as the operations illustrated in FIG. 7. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 7, or other operations for performing the various techniques discussed herein. In certain aspects, computer-readable medium/memory 1612 stores code 1614 for detecting at least one condition including at least one of time, location information for the UE, or direction information for the UE; code 1616 for determining a modified synchronization signal block (SSB) burst parameter based on the detected condition; and code 1618 for monitoring SSBs according to the modified SSB burst parameter. In certain aspects, the processor 1604 has circuitry configured to implement the code stored in the computer-readable medium/memory 1612. The processor 1604 includes circuitry 1618 for detecting at least one condition; circuitry 1620 for determining a modified synchronization signal block (SSB) burst parameter based on the detected condition; and circuitry 1622 for monitoring SSBs according to the modified SSB burst parameter.

Figure 17:
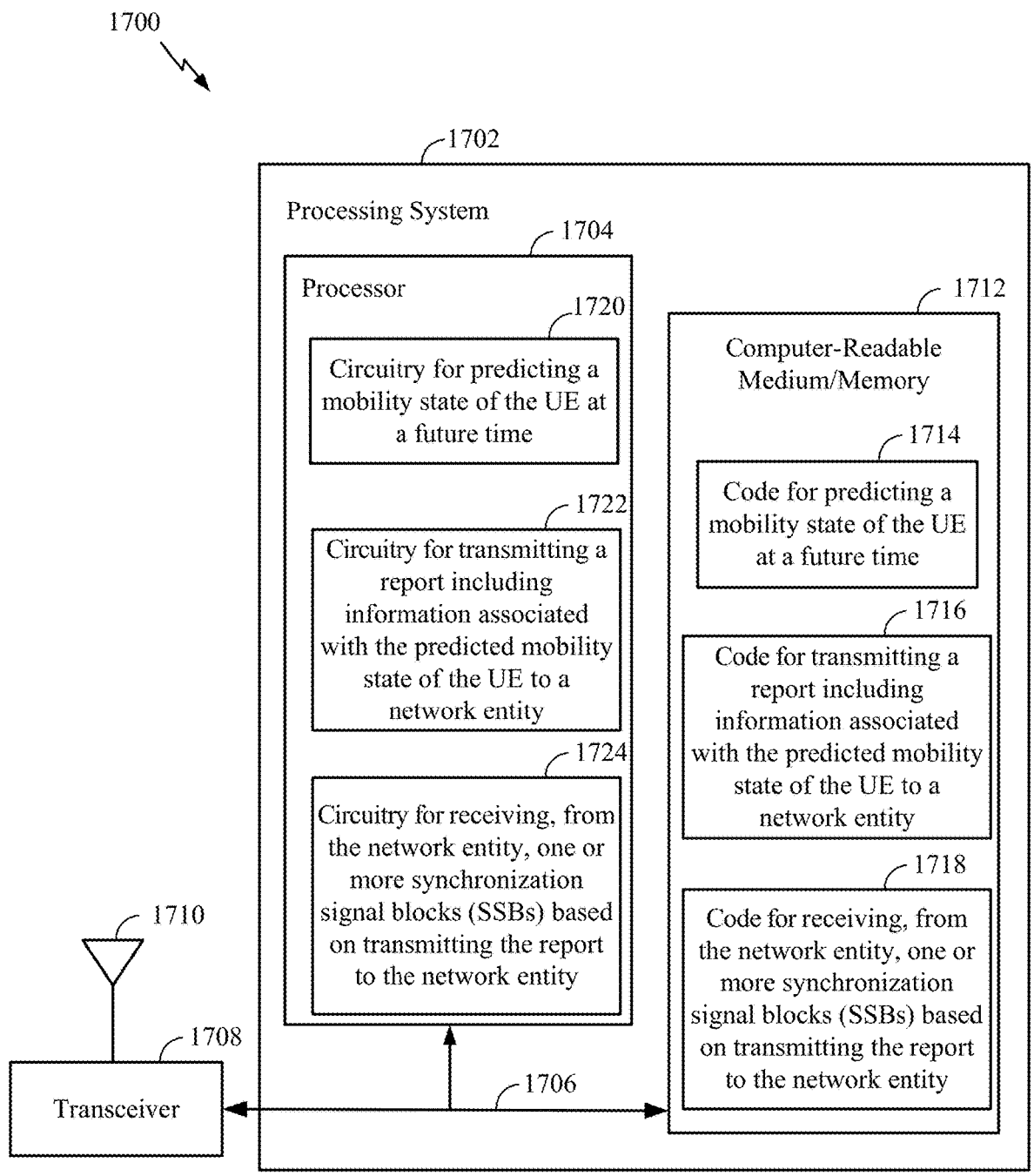
FIG. 17 shows an example communications device that includes components configured to perform operations that support beam selection based on predicted mobility state information for a user equipment (UE), in accordance with aspects of the present disclosure.

FIG. 17 illustrates a communications device 1700 (for example, a user equipment) that may include various components (for example, corresponding to means-plus-function components) configured to perform operations for the techniques disclosed herein, such as the operations illustrated in FIG. 12. The communications device 1700 includes a processing system 1702 coupled to a transceiver 1708 (for example, a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In some aspects, the computer-readable medium/memory 1712 is configured to store instructions (for example, computer-executable code) that when executed by the processor 1704, cause the processor 1704 to perform the operations illustrated in FIG. 12, or other operations for performing the various techniques discussed herein. In some aspects, computer-readable medium/memory 1712 stores code 1714 for predicting a mobility state of the UE at a future time; code 1716 for transmitting a report including information associated with the predicted mobility state of the UE to a network entity; and code 1718 for receiving, from the network entity, one or more synchronization signal blocks (SSBs) based on transmitting the report to the network entity. In some aspects, the processor 1704 has circuitry configured to implement the code stored in the computer-readable medium/memory 1712. The processor 1704 includes circuitry 1720 for predicting a mobility state of the UE at a future time; circuitry 1722 for transmitting a report including information associated with the predicted mobility state of the UE to a network entity; and circuitry 1724 for receiving, from the network entity, one or more synchronization signal blocks (SSBs) based on transmitting the report to the network entity.

Figure 18:
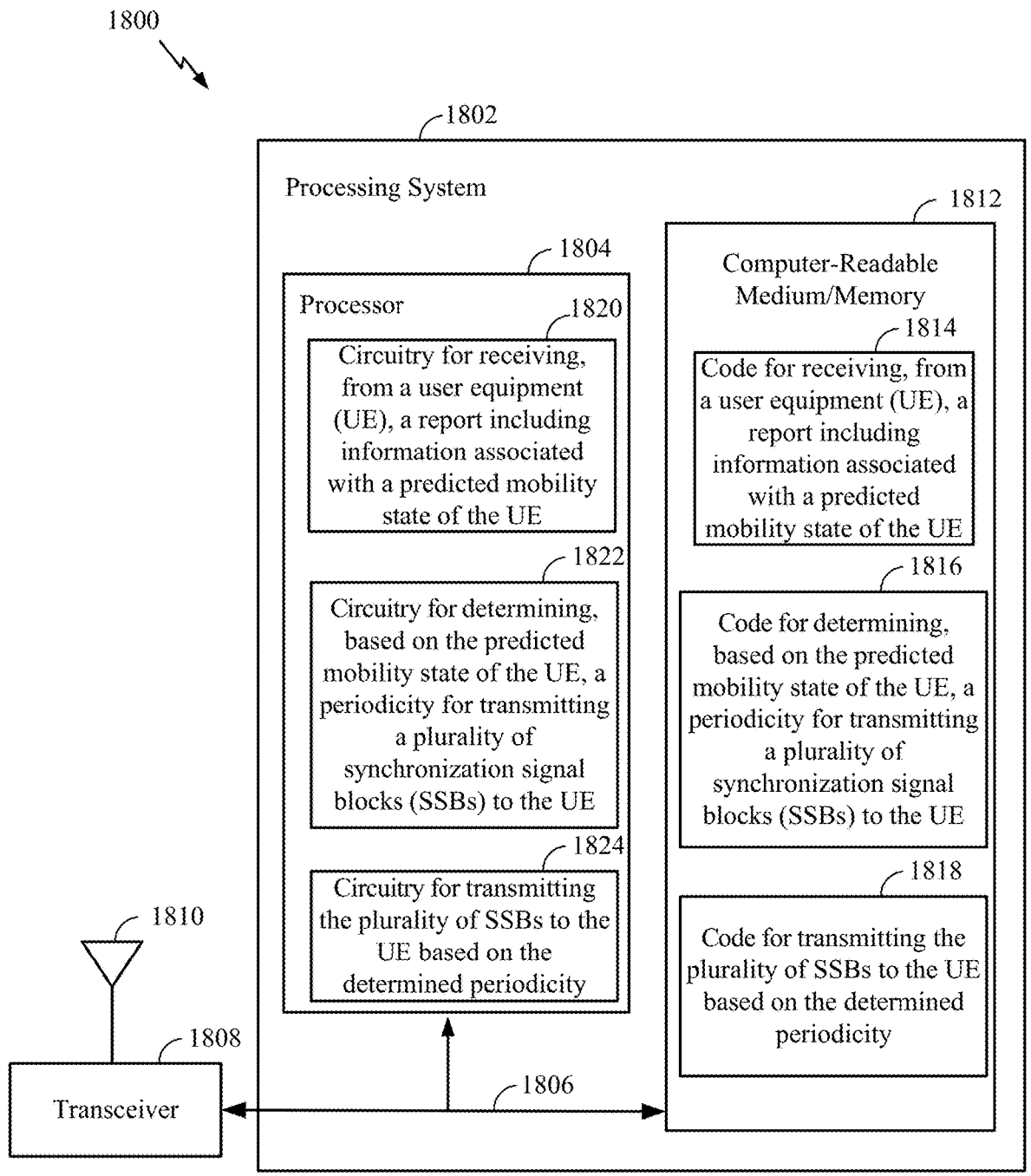
FIG. 18 shows an example communications device that includes components configured to perform operations that support beam selection based on predicted mobility state information for a user equipment (UE), in accordance with aspects of the present disclosure.

FIG. 18 illustrates a communications device 1800 (for example, a network entity such as a gNB) that may include various components (for example, corresponding to means-plus-function components) configured to perform operations for the techniques disclosed herein, such as the operations illustrated in FIG. 13. The communications device 1000 includes a processing system 1002 coupled to a transceiver 1008 (for example, a transmitter and/or a receiver). The transceiver 1008 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In some aspects, the computer-readable medium/memory 1812 is configured to store instructions (for example, computer-executable code) that when executed by the processor 1804, cause the processor 1804 to perform the operations illustrated in FIG. 13, or other operations for performing the various techniques discussed herein. In some aspects, computer-readable medium/memory 1812 stores code 1814 for receiving, from a UE, a report including information associated with a predicted mobility state of the UE; code 1816 for determining, based on the predicted mobility state of the UE, a periodicity for transmitting a plurality of synchronization signal blocks (SSBs) to the UE; and code 1818 for transmitting the plurality of SSBs to the UE based on the determined periodicity. In some aspects, the processor 1804 has circuitry configured to implement the code stored in the computer-readable medium/memory 1812. The processor 1804 includes circuitry 1820 for receiving, from a UE, a report including information associated with a predicted mobility state of the UE; circuitry 1822 for determining, based on the predicted mobility state of the UE, a periodicity for transmitting a plurality of synchronization signal blocks (SSBs) to the UE; and circuitry 1824 for transmitting the plurality of SSBs to the UE based on the determined periodicity.

Example Aspects

In addition to the various aspects described above, aspects of specific combinations are within the scope of the disclosure, some of which are detailed below:

Aspect 1: A method for wireless communication for a network entity, comprising: detecting at least one condition involving at least one of time, location information for one or more user equipments (UEs), or direction information for the one or more UEs; modifying at least one synchronization signal block (SSB) burst parameter based on the detected condition; and transmitting SSBs according to the modified SSB burst parameter.

Aspect 2: The method of Aspect 1, wherein the modified SSB burst parameter is determined using a machine learning (ML) algorithm.

Aspect 3: The method of any one of Aspects 1-2, wherein the at least one condition further involves a transition of one or more UEs to or from an initial acquisition mode, idle mode, or connected mode.

Aspect 4: The method of any one of Aspects 1-3, wherein modifying the SSB burst parameter comprises modifying an SSB burst pattern.

Aspect 5: The method of Aspect 4, wherein modifying the SSB burst pattern comprises reducing a number of SSB beams swept based on the at least one condition.

Aspect 6: The method of Aspect 5, further comprising determining the reduced number of SSB beams by analyzing historical data, wherein the analyzing comprises: determining usage statistics of SSB beams of the SSB burst pattern, before modification; and identifying SSB beams that are more heavily used than other SSB beams.

Aspect 7: The method of any one of Aspects 4-6, wherein modifying the SSB burst pattern comprises modifying at least one of an SSB duration, an SSB periodicity, or number of SSB beams swept.

Aspect 8: The method of any one of Aspects 1-7, further comprising providing information regarding at least the modified SSB burst parameter via broadcast system information.

Aspect 9: The method of Aspect 8 wherein: the modified SSB burst set has a reduced number of SSB beams swept than the SSB burst set before modification; and the broadcast information indicates a time and duration for the modified SSB burst set.

Aspect 10: The method of any one of Aspects 1-9, wherein: the SSB burst parameter comprises a transmit power distribution across a set of SSB beams of the SSB burst pattern; and transmitting SSBs according to the modified SSB burst parameter comprises transmitting a first subset of the set of SSB beams using a higher transmit power relative to a second subset of the set of SSB beams.

Aspect 11: The method of Aspect 10, further comprising determining the first subset of SSB beams based on the at least one condition.

Aspect 12: The method of Aspect 11, wherein the first subset of SSB beams is determined by analyzing historical data, wherein the analyzing comprises: determining usage statistics of SSB beams of the SSB burst pattern; selecting, as the first subset of SSB beams, SSB beams that are more frequently used than other SSB beams; and selecting, as the second subset of SSB beams, SSB beams that are less frequently used than the first subset of SSB beams.

Aspect 13: The method of any one of Aspects 10-12, wherein the network entity transmits SSBs with the first subset of SSB beams with higher transmit power than SSBs with the second subset of SSB beams when transmitting the SSB burst pattern at certain times; and the network entity transmits SSBs with the first subset of SSB beams and second subset of SSB beams with the same transmit power at other times.

Aspect 14: The method of Aspect 13, wherein: the network entity transmits SSBs with the first subset of SSB beams with higher transmit power than SSBs with the second subset of SSB beams when one or more user equipments (UEs) are in a connected mode; and the network entity transmits SSBs with the first subset of SSB beams and second subset of SSB beams with the same transmit power when one or more UEs are in an idle or initial acquisition mode.

Aspect 15: The method of any one of Aspects 10-14, further comprising providing information regarding the first subset of SSB beams and a difference in transmit power used for the first subset of SSB beams and the second subset of SSB beams.

Aspect 16: The method of Aspect 15, wherein the information is provided via broadcast system information.

Aspect 17: The method of any one of Aspects 15-16, wherein the information indicates at least one of: the first subset of SSB beams by one or more beam indexes or one or more beam index sets; a difference in the transmit power used to transmit SSBs with the first subset of SSB beams and the transmit power used to transmit SSBs with the second subset of SSB beams; or a scaling factor used to derive the transmit power used to transmit SSBs with the second subset of SSB beams from the transmit power used to transmit SSBs with the first subset of SSB beams.

Aspect 18: An apparatus for wireless communication for a user equipment (UE), comprising: a processor configured to detect at least one condition comprising at least one of time, location information for the UE, or direction information for the UE, and determine a modified synchronization signal block (SSB) burst parameter based on the detected condition; and a receiver configured to monitor SSBs according to the modified SSB burst parameter.

Aspect 19: The apparatus of Aspect 18, wherein the receiver is configured to monitor SSBs according to the modified SSB burst parameter, the modified SSB burst parameter is a modified SSB burst pattern comprising a reduced number of SSB beams swept based on the condition.

Aspect 20: The apparatus of Aspect 19, wherein the receiver is configured to receive modified SSB measurements and reporting based on the modified SSB burst pattern.

Aspect 21: The apparatus of any one of Aspects 19-20, wherein the modified SSB burst pattern has at least one of an SSB duration, an SSB periodicity, or number of SSB beams swept modified relative to the SSB burst pattern before modification.

Aspect 22: The apparatus of any one of Aspects 18-21, wherein the at least one condition involves a transition of one or more user equipments (UEs) to or from an initial acquisition mode, idle mode, or connected mode.

Aspect 23: The apparatus of any one of Aspects 18-22, wherein the receiver is configured to obtain information regarding at least the modified SSB burst parameter via broadcast system information.

Aspect 24: The apparatus of Aspect 23, wherein the information includes a modified SSB burst set having a reduced number of SSB beams swept than a SSB burst set before modification; and the information indicates a time and duration for the modified SSB burst set.

Aspect 25: The apparatus of any one of Aspects 23-24, wherein the processor is configured to use the information regarding at least the modified SSB burst parameter when making mobility related decisions, wherein the processor is configured to adjust at least one of SSB measurements or SSB measurement reporting based on the information.

Aspect 26: The apparatus of any one of Aspects 18-25, wherein the receiver is configured to obtain information regarding a first subset of SSB beams transmitted with higher transmit power than SSB beams transmitted with a second subset of the SSB beams and to monitor SSBs according to the SSB burst pattern.

Aspect 27: The apparatus of Aspect 26, wherein the information obtained from the receiver indicates that the first subset of SSB beams are transmitted with higher transmit power than SSBs with the second subset of SSB beams when transmitting the SSB burst pattern at certain times; and that the first subset of SSB beams and second subset of SSB beams transmitted with the same transmit power at other times.

Aspect 28: The apparatus of any one of Aspects 26-27, the information indicates at least one of: a difference in the transmit power used to transmit SSBs with the first subset of SSB beams and the transmit power used to transmit SSBs with the second subset of SSB beams; or a scaling factor used to derive the transmit power used to transmit SSBs with the second subset of SSB beams from the transmit power used to transmit SSBs with the first subset of SSB beams; or a time and duration for when a network entity transmits SSBs with the first subset of SSB beams with higher transmit power than SSBs with the second subset of SSB beams; and the processor adjusts reference signal receive power RSRP measurements for the second subset of SSB beams based on the difference in transmit power or scaling factor.

Aspect 29: A method for wireless communications by a user equipment (UE), comprising: predicting a mobility state of the UE at a future time; transmitting, to a network entity, a report including information associated with the predicted mobility state of the UE; and receiving, from the network entity, one or more synchronization signal blocks (SSBs) based on transmitting the report to the network entity.

Aspect 30: The method of Aspect 29, wherein predicting the mobility state of the UE comprises predicting the mobility state based on a machine learning model trained to predict whether the UE will be moving or stationary based on time and location information.

Aspect 31: The method of any one of Aspects 29-30, wherein predicting the mobility state of the UE comprises predicting the mobility state based on UE contextual information.

Aspect 32: The method of Aspect 31, wherein the contextual information comprises a signal strength metric for a signal received from each of a plurality of network entities.

Aspect 33: The method of any one of Aspects 29-32, wherein predicting the mobility state of the UE comprises: periodically receiving a triggering message to predict the mobility state of the UE; and determining the mobility state of the UE in response to receiving the triggering message.

Aspect 34: The method of any one of Aspects 29-33, wherein predicting the mobility state of the UE comprises: identifying an occurrence of one or more predefined triggering events; and determining the mobility state of the UE in response to identifying the occurrence of the one or more predefined triggering events.

Aspect 35: The method of any one of Aspects 29-34, wherein the report is transmitted via one of radio resource control (RRC) signaling, a medium access control (MAC) control element (CE) (MAC-CE), or uplink control information (UCI).

Aspect 36: The method of any one of Aspects 29-35, further comprising: determining a location of the UE, wherein the report further includes the determined location of the UE, and wherein receiving the one or more SSBs is based on the determined location of the UE.

Aspect 37: The method of any one of Aspects 29-36, wherein the received one or more SSBs comprise SSBs selected by the network entity based on the information associated with the mobility state of the UE.

Aspect 38: A method for wireless communications by a network entity, comprising: receiving, from a user equipment (UE), a report including a predicted mobility state of the UE; determining, based on the predicted mobility state of the UE, a periodicity for transmitting a plurality of synchronization signal blocks (SSBs) to the UE; and transmitting the plurality of SSBs based on the determined periodicity.

Aspect 39: The method of Aspect 38, wherein the report further includes a location of the UE.

Aspect 40: The method of Aspect 39 further comprising: determining, based on the location of the UE, an SSB pattern including the plurality of SSBs to transmit and a transmit power for each of the plurality of SSBs in the plurality of SSBs.

Aspect 41: The method of any one Aspects 38-40, further comprising: transmitting, to the UE, configuration information identifying a number of network entities for the UE to monitor to determine the predicted UE mobility state.

Aspect 42: The method of any one Aspects 38-41, wherein the report is received via one of radio resource control (RRC) signaling, a medium access control (MAC) control element (CE) (MAC-CE), or uplink control information (UCI).

Aspect 43: An apparatus for wireless communications by a user equipment (UE), comprising: a processor configured to: predict a mobility state of the UE at a future time; transmit, to a network entity, a report including information associated with the predicted mobility state of the UE; and receive, from the network entity, one or more synchronization signal blocks (SSBs) based on transmitting the report to the network entity; and a memory.

Aspect 44: The apparatus of Aspect 43, wherein the processor is configured to predict the mobility state of the UE by predicting the mobility state based on a machine learning model trained to predict whether the UE will be moving or stationary based on time and location information.

Aspect 45: The apparatus of any one of Aspects 43-44, wherein the processor is configured to predict the mobility state of the UE by predicting the mobility state based on UE contextual information.

Aspect 46: The apparatus of Aspect 45, wherein the contextual information comprises a signal strength metric for a signal received from each of a plurality of network entities.

Aspect 47: The apparatus of any one of Aspects 43-46, wherein the processor is configured to predict the mobility state of the UE by: periodically receiving a triggering message to predict the mobility state of the UE; and determining the mobility state of the UE in response to receiving the triggering message.

Aspect 48: The apparatus of any one of Aspects 43-47, wherein the processor is configured to predict the mobility state of the UE by: identifying an occurrence of one or more predefined triggering events; and determining the mobility state of the UE in response to identifying the occurrence of the one or more predefined triggering events.

Aspect 49: The apparatus of any one of Aspects 43-48, wherein the report is transmitted via one of radio resource control (RRC) signaling, a medium access control (MAC) control element (CE) (MAC-CE), or uplink control information (UCI).

Aspect 50: The apparatus of any one of Aspects 43-49, wherein the processor is further configured to: determine a location of the UE, wherein the report further includes the determined location of the UE, and wherein the processor is configured to receive the one or more SSBs is based on the determined location of the UE.

Aspect 51: The apparatus of any one of Aspects 43-50, wherein the received one or more SSBs comprise SSBs selected by the network entity based on the information associated with the mobility state of the UE.

Aspect 52: An apparatus for wireless communications by a network entity, comprising: a processor configured to: receive, from a user equipment (UE), a report including a predicted mobility state of the UE, determine, based on the predicted mobility state of the UE, a periodicity for transmitting a plurality of synchronization signal blocks (SSBs) to the UE, and transmit the plurality of SSBs based on the determined periodicity; and a memory.

Aspect 53: The apparatus of Aspect 52, wherein the report further includes a location of the UE.

Aspect 54: The apparatus of Aspect 53, wherein the processor is further configured to: determine, based on the location of the UE, an SSB pattern including the plurality of SSBs to transmit and a transmit power for each of the plurality of SSBs in the plurality of SSBs.

Aspect 55: The apparatus of any one Aspects 52-54, wherein the processor is further configured to: transmit, to the UE, configuration information identifying a number of network entities for the UE to monitor to determine the predicted UE mobility state.

Aspect 56: The apparatus of any one Aspects 52-55, wherein the report is received via one of radio resource control (RRC) signaling, a medium access control (MAC) control element (CE) (MAC-CE), or uplink control information (UCI).

Aspect 57: An apparatus for wireless communications by a user equipment (UE), comprising: means for predicting a mobility state of the UE at a future time; means for transmitting, to a network entity, a report including information associated with the predicted mobility state of the UE; and means for receiving, from the network entity, one or more synchronization signal blocks (SSBs) based on transmitting the report to the network entity.

Aspect 58: An apparatus for wireless communications by a network entity, comprising: means for receiving, from a user equipment (UE), a report including a predicted mobility state of the UE; means for determining, based on the predicted mobility state of the UE, a periodicity for transmitting a plurality of synchronization signal blocks (SSBs) to the UE; and means for transmitting the plurality of SSBs based on the determined periodicity.

Aspect 59: A computer-readable medium having instructions stored thereon which, when executed by a processor, performs an operation for wireless communications by a user equipment (UE), the operation comprising: predicting a mobility state of the UE at a future time; transmitting, to a network entity, a report including information associated with the predicted mobility state of the UE; and receiving, from the network entity, one or more synchronization signal blocks (SSBs) based on transmitting the report to the network entity.

Aspect 60: A computer-readable medium having instructions stored thereon which, when executed by a processor, performs an operation for wireless communications by a network entity, the operation comprising: receiving, from a user equipment (UE), a report including a predicted mobility state of the UE; determining, based on the predicted mobility state of the UE, a periodicity for transmitting a plurality of synchronization signal blocks (SSBs) to the UE; and transmitting the plurality of SSBs based on the determined periodicity.

Aspect 61: A method for wireless communication for a user equipment (UE), comprising: detecting at least one condition; determining a modified synchronization signal block (SSB) burst pattern that identifies SSB positions for sweeping a set of SSB beams based on the detected condition; and monitoring SSBs according to the modified SSB burst pattern.

Aspect 62: An apparatus for wireless communication for a network entity, comprising: means for detecting at least one condition; means for modifying a synchronization signal block (SSB) burst pattern that identifies SSB positions for sweeping a set of SSB beams based on the detected condition; and means for transmitting SSBs according to the modified SSB burst pattern.

Aspect 63: An apparatus for wireless communication for a user equipment (UE), comprising: means for detecting at least one condition; means for determining a modified synchronization signal block (SSB) burst pattern that identifies SSB positions for sweeping a set of SSB beams based on the detected condition; and means for monitoring SSBs according to the modified SSB burst pattern.

Aspect 64: An apparatus for wireless communication for a network entity, comprising: at least one processor configured to detecting at least one condition and modify a synchronization signal block (SSB) burst pattern that identifies SSB positions for sweeping a set of SSB beams based on the detected condition; and a transmitter configured to transmit SSBs according to the modified SSB burst pattern.

Aspect 65: A method for wireless communication for a user equipment (UE), comprising: determining a synchronization signal block (SSB) burst pattern that identifies SSB positions that a network entity uses for sweeping a set of SSB beams; obtaining information regarding a first subset of the SSB beams transmitted with higher transmit power than SSB beams transmitted with a second subset of the SSB beams; monitoring SSBs according to the SSB burst pattern;

and adjusting at least one of SSB measurements or SSB measurement reporting based on the information.

Aspect 66: An apparatus for wireless communication for a network entity, comprising: means for determining a synchronization signal block (SSB) burst pattern that identifies SSB positions for sweeping a set of SSB beams; and means for transmitting SSBs according to the SSB burst pattern, wherein SSBs transmitted with a first subset of SSB beams are transmitted with higher transmit power than SSBs transmitted with a second subset of SSB beams.

Aspect 67: An apparatus for wireless communication for a user equipment (UE), comprising: means for determining a synchronization signal block (SSB) burst pattern that identifies SSB positions that a network entity uses for sweeping a set of SSB beams; means for obtaining information regarding a first subset of the SSB beams transmitted with higher transmit power than SSB beams transmitted with a second subset of the SSB beams; means for monitoring SSBs according to the SSB burst pattern; and means for adjusting at least one of SSB measurements or SSB measurement reporting based on the information.

Aspect 68: An apparatus for wireless communication for a network entity, comprising: at least one processor configured to determine a synchronization signal block (SSB) burst pattern that identifies SSB positions for sweeping a set of SSB beams; and a transmitter configured to transmit SSBs according to the SSB burst pattern, wherein SSBs transmitted with a first subset of SSB beams are transmitted with higher transmit power than SSBs transmitted with a second subset of SSB beams.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6 and 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a network entity, comprising:
   detecting at least one condition involving at least one of a time of day or position information of one or more user equipments (UEs);
   modifying at least one synchronization signal block (SSB) burst parameter based on the detected condition; and
   transmitting SSBs in a modified SSB burst set according to the modified SSB burst parameter.

2. The method of claim 1, wherein the modified SSB burst parameter is determined using a machine learning (ML) algorithm.

3. The method of claim 1, wherein the at least one condition further involves a transition of one or more UEs to or from an initial acquisition mode, idle mode, or connected mode.

4. The method of claim 1, wherein modifying the SSB burst parameter comprises modifying an SSB burst pattern.

5. The method of claim 4, wherein modifying the SSB burst pattern comprises reducing a number of SSB beams swept based on the at least one condition.

6. The method of claim 5, further comprising determining the reduced number of SSB beams based on historical data, comprising:
   determining usage statistics of SSB beams of the SSB burst pattern, before modification; and
   identifying SSB beams that are more heavily used than other SSB beams.

7. The method of claim 4, wherein modifying the SSB burst pattern comprises modifying at least one of an SSB duration, an SSB periodicity, or number of SSB beams swept.

8. The method of claim 1, further comprising providing information regarding at least the modified SSB burst parameter via broadcast system information.

9. The method of claim 8, wherein:
   the modified SSB burst set has a reduced number of SSB beams swept relative to an SSB burst set before modification; and
   the broadcast system information indicates a time and duration for the modified SSB burst set.

10. The method of claim 1, wherein:
    the SSB burst parameter comprises a transmit power distribution across a set of SSB beams of an SSB burst pattern; and
    transmitting SSBs according to the modified SSB burst parameter comprises transmitting a first subset of the set of SSB beams using a higher transmit power relative to a second subset of the set of SSB beams.

11. The method of claim 10, further comprising determining the first subset of SSB beams based on the at least one condition.

12. The method of claim 11, wherein determining the first subset of SSB beams is based on historical data and comprises:
    determining usage statistics of set of SSB beams of the SSB burst pattern;
    selecting, as the first subset of SSB beams, SSB beams that are more frequently used than other SSB beams; and
    selecting, as the second subset of SSB beams, SSB beams that are less frequently used than the first subset of SSB beams.

13. The method of claim 10, wherein:
    the network entity transmits SSBs with the first subset of SSB beams with higher transmit power than SSBs with the second subset of SSB beams when transmitting the SSB burst pattern at certain times; and
    the network entity transmits SSBs with the first subset of SSB beams and second subset of SSB beams with a same transmit power at other times.

14. The method of claim 10, wherein:
the network entity transmits SSBs with the first subset of SSB beams with higher transmit power than SSBs with the second subset of SSB beams when the one or more UEs are in a connected mode; and
the network entity transmits SSBs with the first subset of SSB beams and second subset of SSB beams with a same transmit power when one or more UEs are in an idle or initial acquisition mode.

15. The method of claim 10, further comprising providing information regarding the first subset of SSB beams and a difference in transmit power used for the first subset of SSB beams and the second subset of SSB beams.

16. The method of claim 15, wherein the information is provided via broadcast system information.

17. The method of claim 15, wherein the information indicates at least one of:
the first subset of SSB beams by one or more beam indexes or one or more beam index sets;
a difference in the transmit power used to transmit SSBs with the first subset of SSB beams and the transmit power used to transmit SSBs with the second subset of SSB beams; or
a scaling factor used to derive the transmit power used to transmit SSBs with the second subset of SSB beams from the transmit power used to transmit SSBs with the first subset of SSB beams.

18. A processing system for wireless communication by a user equipment (UE), comprising:
one or more processors individually or collectively configured to execute instructions stored on one or more processors and to cause the UE to:
detect at least one condition comprising at least one of a time of day or position information of the UE; and
determine a modified synchronization signal block (SSB) burst parameter based on the detected at least one condition; and
monitor SSBs in a modified SSB burst set according to the modified SSB burst parameter.

19. The processing system of claim 18, wherein:
the one or more processors are further configured to cause the UE to monitor SSBs according to the modified SSB burst parameter; and
the modified SSB burst parameter indicates a modified SSB burst pattern comprising a reduced number of SSB beams swept based on the at least one condition.

20. The processing system of claim 19, wherein the one or more processors are further configured to cause the UE to receive modified SSB measurements based on the modified SSB burst pattern.

21. The processing system of claim 20, wherein the modified SSB burst pattern has at least one of an SSB duration, an SSB periodicity, or number of SSB beams swept modified relative to an SSB burst pattern before modification.

22. The processing system of claim 18, wherein the at least one condition involves a transition of one or more UEs to or from an initial acquisition mode, idle mode, or connected mode.

23. The processing system of claim 18, wherein the one or more processors are further configured to cause the UE to obtain information regarding at least the modified SSB burst parameter via broadcast system information.

24. The processing system of claim 23, wherein:
the information indicates the modified SSB burst set has a reduced number of SSB beams swept relative to an SSB burst set before modification; and
the information indicates a time and duration for the modified SSB burst set.

25. The processing system of claim 23, wherein the one or more processors are further configured to cause the UE to:
use the information regarding at least the modified SSB burst parameter when making mobility related decisions; and
adjust at least one of SSB measurements or SSB measurement reporting based on the information.

26. The processing system of claim 18, wherein the one or more processors are further configured to cause the UE to obtain information regarding a first subset of SSB beams transmitted with higher transmit power than SSB beams transmitted with a second subset of the SSB beams and to monitor SSBs according to an SSB burst pattern.

27. The processing system of claim 26, wherein the information indicates that:
at certain times, SSBs transmitted with the first subset of SSB beams are transmitted using a transmit power that is higher than a transmit power used to transmit SSBs with the second subset of SSB beams; and
at other times, SSBs transmitted with the first subset of SSB beams and second subset of SSB beams are transmitted with a same transmit power.

28. The processing system of claim 27, wherein:
the information indicates at least one of:
a difference in the transmit power used to transmit the SSBs with the first subset of SSB beams and the transmit power used to transmit the SSBs with the second subset of SSB beams;
a scaling factor used to derive the transmit power used to transmit the SSBs with the second subset of SSB beams from the transmit power used to transmit the SSBs with the first subset of SSB beams; or
a time and duration for when a network entity transmits the SSBs with the first subset of SSB beams with higher transmit power than the SSBs with the second subset of SSB beams; and
the one or more processors are further configured to cause the UE to adjust reference signal receive power (RSRP) measurements for the second subset of SSB beams based on the difference in transmit power or the scaling factor.

29. A method for wireless communication by a user equipment (UE), comprising:
detecting at least one condition comprising at least one of a time of day or position information of the UE;
determining a modified synchronization signal block (SSB) burst parameter based on the detected at least one condition; and
monitoring SSBs in a modified SSB burst set according to the modified SSB burst parameter.

30. A processing system for wireless communication by a network entity, comprising:
one or more processors individually or collectively configured to execute instructions stored on one or more memories and to cause the network entity to:
detect at least one condition involving at least one of a time of day or position information of one or more user equipments (UEs);
modify at least one synchronization signal block (SSB) burst parameter based on the detected condition; and
transmit SSBs in a modified SSB burst set according to the modified SSB burst parameter.

* * * * *